(12) United States Patent
Nakakura et al.

(10) Patent No.: US 10,731,678 B2
(45) Date of Patent: Aug. 4, 2020

(54) HYDRAULIC DEVICE AND VEHICLE

(71) Applicant: SHIMANO INC., Sakai (JP)

(72) Inventors: Masahiro Nakakura, Sakai (JP); Atsushi Yamazaki, Sakai (JP); Takafumi Nishino, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/882,973

(22) Filed: Jan. 29, 2018

(65) Prior Publication Data

US 2019/0234435 A1    Aug. 1, 2019

(51) Int. Cl.
| | | |
|---|---|---|
| *F15B 21/04* | (2019.01) | |
| *F15B 21/044* | (2019.01) | |
| *B62L 3/02* | (2006.01) | |
| *F15B 15/14* | (2006.01) | |
| *F16D 55/226* | (2006.01) | |
| *F16D 65/18* | (2006.01) | |
| *F16D 65/28* | (2006.01) | |
| *F16D 125/16* | (2012.01) | |

(52) U.S. Cl.
CPC ............ *F15B 21/044* (2013.01); *B62L 3/023* (2013.01); *F15B 15/14* (2013.01); *F16D 55/226* (2013.01); *F16D 65/18* (2013.01); *F16D 65/28* (2013.01); *F16D 2125/16* (2013.01)

(58) Field of Classification Search
CPC ........ B60T 11/30; F15B 21/044; F15B 15/14; B62L 3/023; B62L 1/005; F15D 55/226; F15D 55/228; F15D 65/18; F15D 65/28; F15D 2125/16; F15D 2121/04

USPC .......................................................... 188/352
See application file for complete search history.

(56) References Cited

U.S. PATENT DOCUMENTS

| | | | | | |
|---|---|---|---|---|---|
| 2,853,159 | A | * | 9/1958 | Kuhn, Jr. .................. | F16F 9/20 137/513.3 |
| 3,623,776 | A | * | 11/1971 | Wellman ................... | B60T 8/26 137/493.2 |
| 3,885,391 | A | * | 5/1975 | Campbell ................ | B60T 11/21 60/581 |
| 4,005,763 | A | * | 2/1977 | Wallis .................... | F16F 9/3278 184/24 |
| 4,226,408 | A | * | 10/1980 | Tomita ................... | B60G 15/12 188/289 |
| 4,428,566 | A | * | 1/1984 | de Baan .................. | F16F 9/364 188/269 |
| 5,628,496 | A | * | 5/1997 | Chamberlin .......... | F16F 9/0227 188/269 |
| 5,775,677 | A | * | 7/1998 | Englund ................ | B60G 13/06 188/317 |
| 7,438,083 | B2 | * | 10/2008 | Feith .................... | G05D 16/106 137/315.04 |

(Continued)

FOREIGN PATENT DOCUMENTS

GB             1034625 A  *  6/1966   ............ B60T 11/107

*Primary Examiner* — Xuan Lan Nguyen
(74) *Attorney, Agent, or Firm* — Mori & Ward, LLP

(57) ABSTRACT

A hydraulic device comprises a hydraulic structure and a release member. The hydraulic structure includes an interior space in which a fluid is to be filled. The release member is attached to the hydraulic structure so as to be exposed to the interior space and an atmosphere. The release member is configured to release air from the interior space toward the atmosphere in accordance with an internal pressure of the interior space.

27 Claims, 18 Drawing Sheets

(56) References Cited

U.S. PATENT DOCUMENTS

| | | | | |
|---|---|---|---|---|
| 7,644,943 B2* | 1/2010 | Hayes | ............ | B60G 11/27 |
| | | | | 267/64.16 |
| 8,511,652 B2* | 8/2013 | Moulik | ............ | B60G 15/14 |
| | | | | 267/122 |
| 8,800,975 B2* | 8/2014 | Moulik | ............ | B60G 15/14 |
| | | | | 267/64.24 |
| 9,096,288 B2* | 8/2015 | Nago | ............ | B62L 3/023 |
| 9,291,222 B2* | 3/2016 | Hummel | ............ | F16D 65/0031 |
| 2018/0304174 A1* | 10/2018 | Koehne | ............ | B01D 19/0031 |

* cited by examiner

HYDRAULIC DEVICE AND VEHICLE

BACKGROUND OF THE INVENTION

Field of the Invention

The present invention relates to a hydraulic device and a vehicle.

Discussion of the Background

Hydraulic devices have been known in a mechanical field.

SUMMARY OF THE INVENTION

In accordance with a first aspect of the present invention, a hydraulic device comprises a hydraulic structure and a release member. The hydraulic structure includes an interior space in which a fluid is to be filled. The release member is attached to the hydraulic structure so as to be exposed to the interior space and an atmosphere. The release member is configured to release air from the interior space toward the atmosphere in accordance with an internal pressure of the interior space.

With the hydraulic device according to the first aspect, the release member releases air from the interior space filled with the fluid toward the atmosphere in accordance with the internal pressure of the interior space. Thus, it is possible to remove air from the interior space of the hydraulic device in use of the hydraulic device.

In accordance with a second aspect of the present invention, the hydraulic device according to the first aspect is configured so that the hydraulic structure includes a piston and a base member having a cylinder bore in which the piston is movably arranged.

With the hydraulic device according to the second aspect, it is possible to release air from the interior space of the hydraulic device with the release member while generating a hydraulic pressure using the piston and the cylinder bore.

In accordance with a third aspect of the present invention, the hydraulic device according to the second aspect is configured so that the hydraulic structure includes a seal member provided between the piston and the cylinder bore without contacting the release member.

With the hydraulic device according to the third aspect, it is possible to release air from the interior space of the hydraulic device with the release member while improving sealing between the piston and the cylinder with the seal member.

In accordance with a fourth aspect of the present invention, the hydraulic device according to the second or third aspect is configured so that the piston is exposed to the interior space. The release member is provided on the piston.

With the hydraulic device according to the fourth aspect, it is possible to utilize the piston as a place for the release member.

In accordance with a fifth aspect of the present invention, the hydraulic device according to the second aspect is configured so that the hydraulic structure includes a friction member movably provided on the base member in response to a movement of the piston.

With the hydraulic device according to the fifth aspect, it is possible to apply a friction force to another member using the friction member.

In accordance with a sixth aspect of the present invention, the hydraulic device according to any one of the second to fifth aspects is configured so that the hydraulic structure includes an additional piston. The base member has an additional cylinder bore in which the additional piston is movably arranged.

With the hydraulic device according to the sixth aspect, it is possible to release air from the interior space of the hydraulic device with the release member while generating the hydraulic pressure using the piston, the cylinder bore, the additional piston, and the additional cylinder bore.

In accordance with a seventh aspect of the present invention, the hydraulic device according to the sixth aspect is configured so that the hydraulic structure includes an additional seal member provided between the additional piston and the additional cylinder bore without contacting the release member.

With the hydraulic device according to the seventh aspect, it is possible to release air from the interior space of the hydraulic device with the release member while improving sealing between the additional piston and the additional cylinder with the additional seal member.

In accordance with an eighth aspect of the present invention, the hydraulic device according to the sixth or seventh aspect further comprises an additional release member attached to the hydraulic structure so as to be exposed to the interior space and the atmosphere. The additional release member is configured to release air from the interior space toward the atmosphere in accordance with the internal pressure of the interior space. The additional piston is exposed to the interior space. The release member is provided on the additional piston.

With the hydraulic device according to the eighth aspect, it is possible to utilize the additional piston as a place for the additional release member.

In accordance with a ninth aspect of the present invention, the hydraulic device according to any one of the sixth to eighth aspects is configured so that the hydraulic structure includes an additional friction member movably provided on the base member in response to a movement of the additional piston.

With the hydraulic device according to the ninth aspect, it is possible to apply a friction force to another member using the additional friction member, In accordance with a tenth aspect of the present invention, the hydraulic device according to the second aspect further comprises an operating member movably provided on the base member so as to operate the piston.

With the hydraulic device according to the tenth aspect, it is possible to operate the piston using the operating member.

In accordance with an eleventh aspect of the present invention, the hydraulic device according to the tenth aspect further comprises a fluid reservoir configured to be in fluid communication with the interior space via a port. The piston is configured to open the port in a rest state where the operating member is in a rest position. The piston is configured to close the port in an operated state where the operating member is in an operated position.

With the hydraulic device according to the eleventh aspect, it is possible to absorb change in volume of the fluid caused by change in usage environment of the hydraulic device using the fluid reservoir.

In accordance with a twelfth aspect of the present invention, the hydraulic device according to the second aspect is configured so that the release member is provided on the base member.

With the hydraulic device according to the twelfth aspect, it is possible to utilize the base member as a place for the release member.

In accordance with a thirteenth aspect of the present invention, the hydraulic device according to the first aspect is configured so that the hydraulic structure includes a flexible hose member defining the interior space. The release member is provided on the flexible hose member.

With the hydraulic device according to the thirteenth aspect, it is possible to apply the release member to the flexible hose member.

In accordance with a fourteenth aspect of the present invention, the hydraulic device according to any one of the first to thirteenth aspects is configured so that the hydraulic structure has an attachment hole extending from the interior space toward the atmosphere. The release member is provided in the attachment hole.

With the hydraulic device according to the fourteenth aspect, the attachment hole makes the release member to be easily attached to the hydraulic structure.

In accordance with a fifteenth aspect of the present invention, the hydraulic device according to the fourteenth aspect is configured so that the attachment hole is provided as a through-hole having a first end opening facing the interior space and a second end opening facing the atmosphere.

With the hydraulic device according to the fifteenth aspect, it is possible to release air with the release member from the interior space using the attachment hole.

In accordance with a sixteenth aspect of the present invention, the hydraulic device according to the fourteenth aspect is configured so that the first end opening has a first diameter. The second end opening has a second diameter smaller than the first diameter.

With the hydraulic device according to the sixteenth aspect, it is possible to stably maintain the release member against the internal pressure in the attachment hole.

In accordance with a seventeenth aspect of the present invention, the hydraulic device according to any one of the first to sixteenth aspects is configured so that the release member is configured to release air from the interior space toward the atmosphere in a case where the internal pressure of the interior space is higher than a threshold pressure.

With the hydraulic device according to the seventeenth aspect, it is possible to release air from the interior space using an increase in the internal pressure of the interior space.

In accordance with an eighteenth aspect of the present invention, the hydraulic device according to any one of the first to seventeenth aspects is configured so that the release member is replaceably attached to the hydraulic structure.

With the hydraulic device according to the eighteenth aspect, it is possible to replace the release member with another release member during maintenance.

In accordance with a nineteenth aspect of the present invention, the hydraulic device according to any one of the first to eighteenth aspects is configured so that the release member is made of a porous material.

With the hydraulic device according to the nineteenth aspect, it is possible to effectively release air from the interior space.

In accordance with a twentieth aspect of the present invention, the hydraulic device according to any one of the first to nineteenth aspects further comprises an intermediate member provided between the hydraulic structure and the release member.

With the hydraulic device according to the twentieth aspect, it is possible to easily attached the release member to the hydraulic structure.

In accordance with a twenty-first aspect of the present invention, the hydraulic device according to the twentieth aspect is configured so that the release member is embedded in the intermediate member with insert molding.

With the hydraulic device according to the twenty-first aspect, it is possible to easily attached the release member to the hydraulic structure.

In accordance with a twenty-second aspect of the present invention, a vehicle comprises the hydraulic device according to any one of the first to twenty-first aspects.

With the vehicle according to the twenty-second aspect, it is possible to apply the hydraulic device to the vehicle.

BRIEF DESCRIPTION OF THE, DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
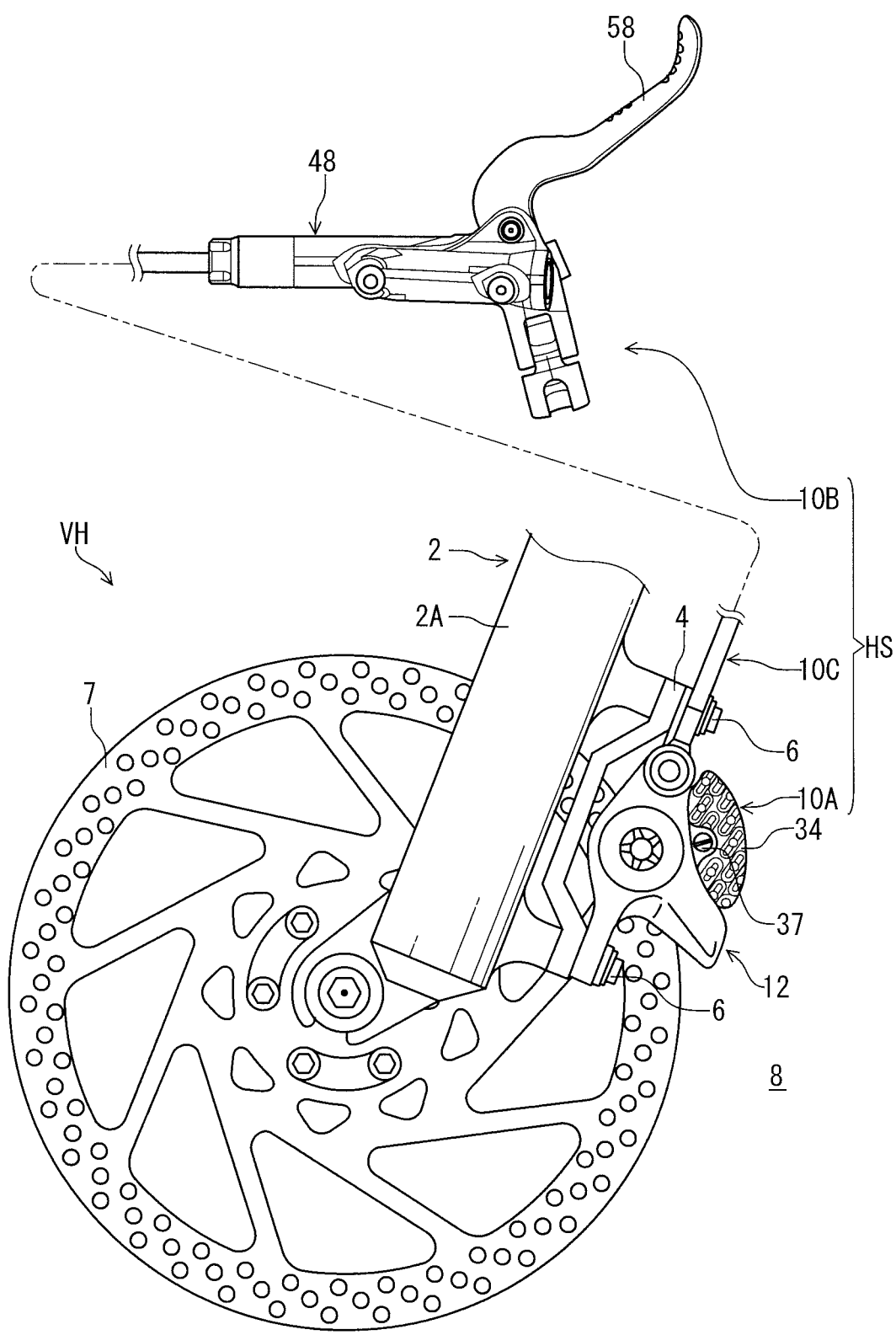
FIG. 1 is a partial side elevational view of a vehicle provided with hydraulic devices in accordance with a first embodiment.

The embodiment(s) will now be described with reference to the accompanying drawings, wherein like reference numerals designate corresponding or identical elements throughout the various drawings.

First Embodiment

Referring initially to FIG. 1, a vehicle VH comprises a hydraulic device in accordance with a first embodiment. In this embodiment, the vehicle VH includes a hydraulic system HS. The hydraulic system HS includes a hydraulic device 10A, a hydraulic device 10B, and a hydraulic device 10C. The hydraulic device 10A is connected to the hydraulic device 10B with the hydraulic device 10C. For example, the vehicle VH includes a human-powered vehicle such as a bicycle. The hydraulic system HS includes a hydraulic brake system. The hydraulic device 10A includes a hydraulic brake caliper. The hydraulic device 10B includes a hydraulic operating device. The hydraulic device 10C includes a hydraulic hose. However, the structure of the hydraulic device described in the present application can apply to other vehicles other than the human-powered vehicle. The structure of the hydraulic device can apply to other hydraulic system other than the hydraulic brake system.

The hydraulic device 10A is mounted to a frame 2 of the vehicle VH with an adapter 4 using a pair of bolts 6. In the illustrated embodiment, the hydraulic device 10A is a front brake and mounted to a front fork 2A of the frame 2. The hydraulic device 10A is configured to apply a braking force to a disc rotor 7 in response to an operation of the hydraulic device 10B. The hydraulic device 10B is mounted to a handlebar (not shown). The hydraulic devices 10A to 10C are surrounded by an atmosphere 8 including air in use.

Figure 2:
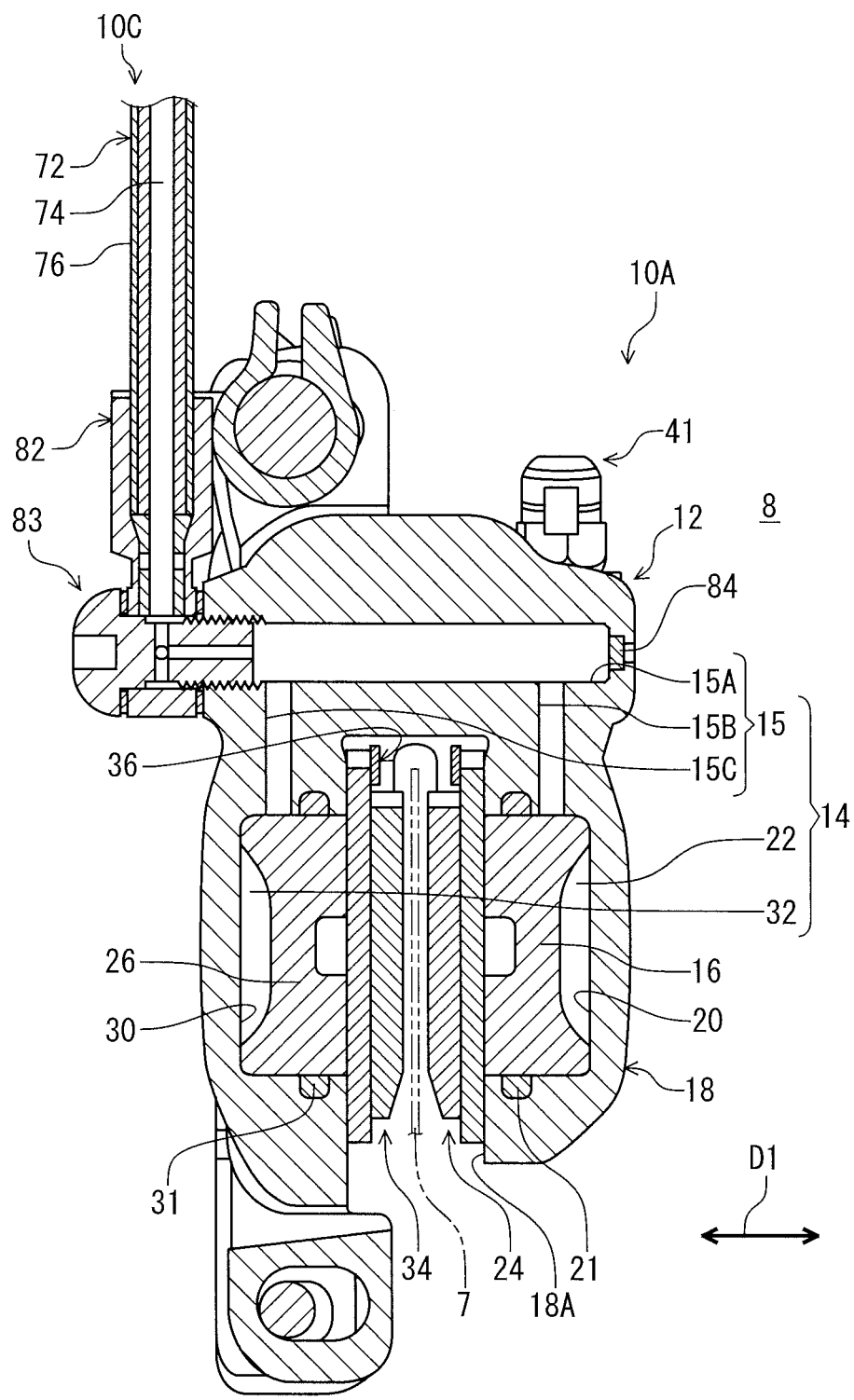
FIG. 2 is a cross-sectional view of the hydraulic device illustrated in FIG. 1.

As seen in FIG. 2, the hydraulic device 10A comprises a hydraulic structure 12. The hydraulic structure 12 includes an interior space 14 in which a fluid is to be filled. The fluid includes a hydraulic fluid such as oil and can include air mixed with the hydraulic fluid. The interior space 14 includes a hydraulic passageway 15. The hydraulic passageway 15 includes a first passageway 15A configured to be connected to the hydraulic device 10C.

The hydraulic structure 12 includes a piston 16 and a base member 18. The base member 18 has a cylinder bore 20 in which the piston 16 is movably arranged. The piston 16 is movable relative to the base member 18 in a movement direction D1. The hydraulic structure 12 includes a seal member 21 provided between the piston 16 and the cylinder bore 20.

The piston 16 is exposed to the interior space 14. The piston 16 partly defines the interior space 14. The cylinder bore 20 is exposed to the interior space 14. The cylinder bore 20 partly defines the interior space 14. In this embodiment, the interior space 14 includes a piston chamber 22 connected to the hydraulic passageway 15. The hydraulic passageway 15 includes a second passageway 15B. The second passageway 15B connects the first passageway 15A to the piston chamber 22. The piston chamber 22 is defined by the piston 16, the cylinder bore 20, and the seal member 21. The piston 16 is exposed to the piston chamber 22 and partly defines the piston chamber 22. The cylinder bore 20 is exposed to the piston chamber 22 and partly defines the piston chamber 22.

The hydraulic structure 12 includes a friction member 24 movably provided on the base member 18 in response to a movement of the piston 16. The base member 18 includes a slit 18A. The friction member 24 is movably provided in the slit 18A and is in contact with the piston 16.

The hydraulic structure 12 includes an additional piston 26. The base member 18 has an additional cylinder bore 30 in which the additional piston 26 is movably arranged. The additional piston 26 is movable relative to the base member 18 in the movement direction D1. The hydraulic structure 12 includes an additional seal member 31 provided between the additional piston 26 and the additional cylinder bore 30.

The additional piston 26 is exposed to the interior space 14. The additional piston 26 partly defines the interior space 14. The additional cylinder bore 30 is exposed to the interior space 14. The additional cylinder bore 30 partly defines the interior space 14. In this embodiment, the interior space 14 includes an additional piston chamber 32 connected to the hydraulic passageway 15. The hydraulic passageway 15 includes a third passageway 15C. The third passageway 15C connects the first passageway 15A to the additional piston chamber 32. The additional piston chamber 32 is defined by the additional piston 26, the additional cylinder bore 30, and the additional seal member 31. The additional piston 26 is exposed to the additional piston chamber 32 and partly defines the additional piston chamber 32. The additional cylinder bore 30 is exposed to the additional piston chamber 32 and partly defines the additional piston chamber 32.

The hydraulic structure 12 includes an additional friction member 34 movably provided on the base member 18 in response to a movement of the additional piston 26. The additional friction member 34 is movably provided in the slit 18A and is in contact with the additional piston 26.

The hydraulic device 10A includes a biasing member 36 provided between the friction member 24 and the additional friction member 34 in the movement direction D1. The biasing member 36 is mounted to the base member 18 using a pad pin 37 (FIG. 1) to bias the friction member 24 and the additional friction member 34 toward the piston 16 and the additional piston 26, respectively.

In this embodiment, a total number of the pistons of the hydraulic device 10A is two. However, the total number of the pistons of the hydraulic device 10A can be one or at least three. A total number of the cylinder bores of the hydraulic device 10A is two. However, the total number of the cylinder bores of the hydraulic device 10A can be one or at least three.

The hydraulic device 10A further comprising a bleeding member 41. The bleeding member 41 is attached to the hydraulic structure 12 to bleed the fluid from the interior space 14 during maintenance. The bleeding member 41 is connected to the hydraulic passageway 15 of the interior space 14.

Figure 3:
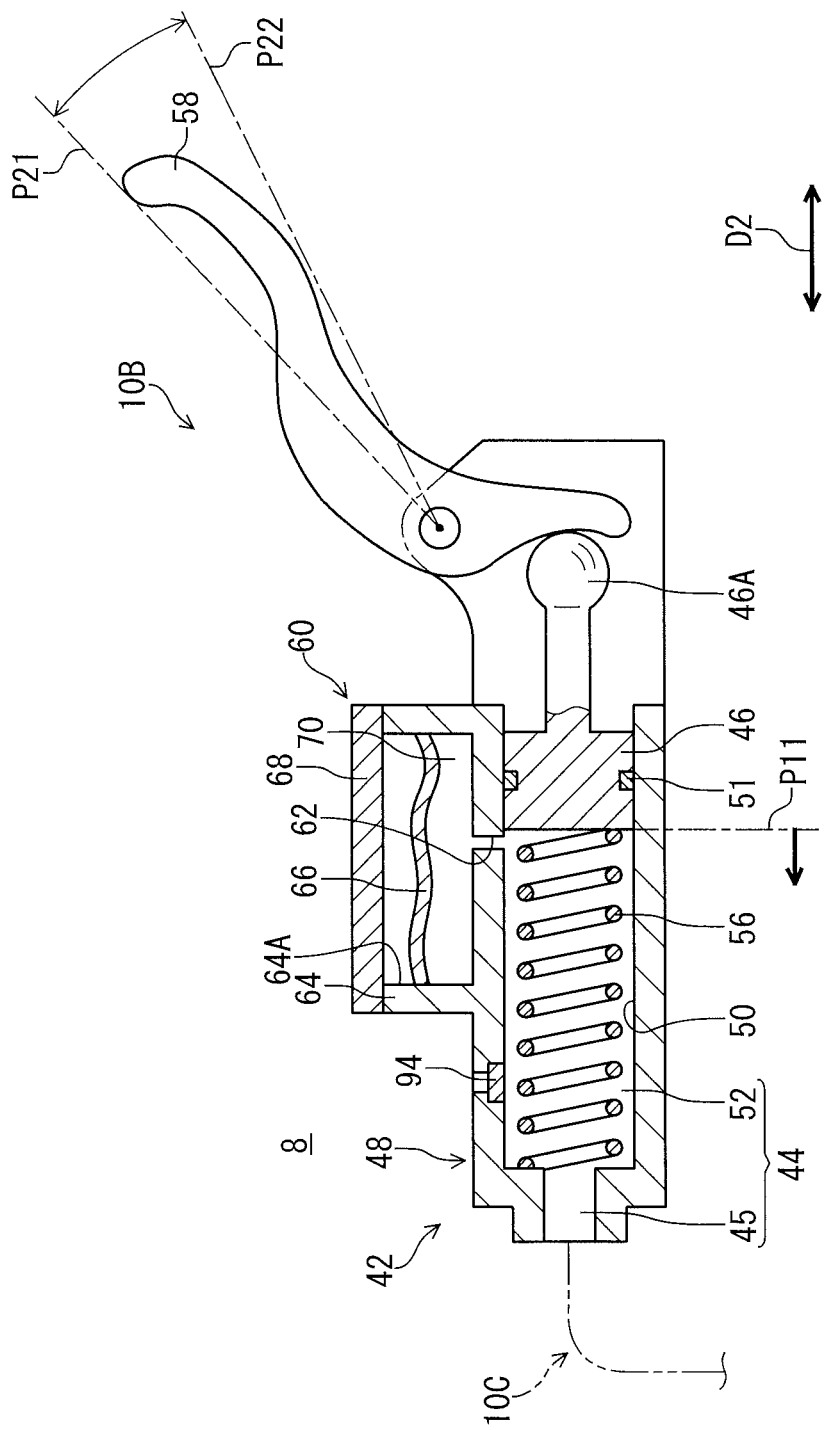
FIG. 3 is a cross-sectional view of another hydraulic device illustrated in FIG. 1.

As seen in FIG. 3, the hydraulic device 10B comprises a hydraulic structure 42. The hydraulic structure 42 includes an interior space 44 in which the fluid is to be filled. The interior space 44 includes a hydraulic passageway 45 configured to be connected to the hydraulic device 10C.

The hydraulic structure 42 includes a piston 46 and a base member 48. The base member 48 has a cylinder bore 50 in which the piston 46 is movably arranged. The piston 46 is movable relative to the base member 48 in a movement direction D2. The hydraulic structure 42 includes a seal member 51 provided between the piston 46 and the cylinder bore 50.

The piston 46 is exposed to the interior space 44. The piston 46 partly defines the interior space 44. The cylinder bore 50 is exposed to the interior space 44. The cylinder bore 50 partly defines the interior space 44. In this embodiment, the interior space 44 includes a piston chamber 52 connected to the hydraulic passageway 15. The piston chamber 52 is defined by the piston 46, the cylinder bore 50, and the seal member 51. The piston 46 is exposed to the piston chamber 52 and partly defines the piston chamber 52. The cylinder bore 50 is exposed to the piston chamber 52 and partly defines the piston chamber 52. The hydraulic device 10B includes a biasing member 56 provided in the piston chamber 52 to bias the piston 46 toward an initial position P11.

A total number of the piston of the hydraulic device 10B is one. However, the total number of the piston of the hydraulic device 10B can be at least two. A total number of the cylinder bore of the hydraulic device 10B is one.

However, the total number of the cylinder bore of the hydraulic device 10B can be at least two.

The hydraulic device 10B further comprises an operating member 58 movably provided on the base member 48 so as to operate the piston 46. The operating member 58 is movable relative to the base member 48 between a rest position P21 to an operated position P22. The operating member 58 is biased by a biasing element (not shown) to be in contact with a piston rod 46A of the piston 46.

In the present application, the term "rest position" as used herein refers to a position at which a movable part such as the operating member 58 remains stationary in a state where the movable part is not operated by the user. The term "operated position" as used herein refers to a position at which the movable part has been operated by the user to perform the operation of the bicycle component.

The hydraulic device 10B further comprises a fluid reservoir 60 configured to be in fluid communication with the interior space 44 via a port 62. The piston 46 is configured to open the port 62 in a rest state where the operating member 58 is in the rest position P21. The piston 46 is configured to close the port 62 in an operated state where the operating member 58 is in the operated position P22.

The fluid reservoir 60 includes a reservoir tank 64, a diaphragm 66, and a lid 68. The reservoir tank 64 includes a recess 64A. The diaphragm 66 is provided in the recess 64A to define a reservoir chamber 70. The lid 68 is attached to the reservoir tank 64 to cover the recess 64A. The interior space 44 includes the reservoir chamber 70. The reservoir chamber 70 is configured to be in fluid communication with the piston chamber 52 via the port 62 in the rest state of the operating member 58.

Figure 4:
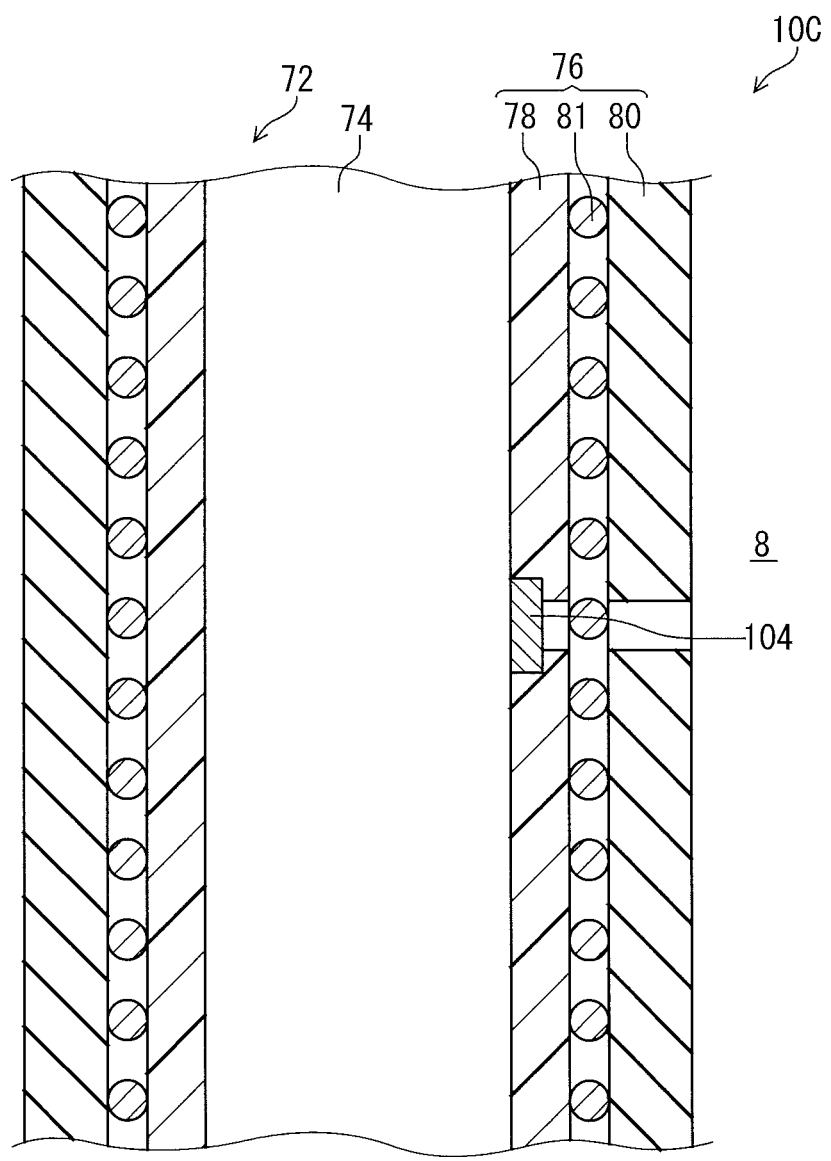
FIG. 4 is a cross-sectional view of another hydraulic device illustrated in FIG. 1.

As seen in FIG. 4, the hydraulic device 10C comprises a hydraulic structure 72. The hydraulic structure 72 includes an interior space 74 in which the fluid is to be filled. The hydraulic structure 72 includes a flexible hose member 76 defining the interior space 74. The flexible hose member 76 includes an inner tube 78, an outer tube 80, and an intermediate layer 81. The inner tube 78 is provided in the outer tube 80. The inner tube 78 defines the interior space 74. The intermediate layer 81 is provided between the inner tube 78 and the outer tube 80. The inner tube 78 is made of a non-metallic material such as a resin material. The outer tube 80 is made of a non-metallic material such as rubber. The intermediate layer 81 is made of a resin material such as resin mesh or a metallic material such as metallic mesh.

As seen in FIG. 2, the hydraulic device 10C comprises a hose connector 82 attached to an end of the flexible hose member 76. The hydraulic device 10A comprises a hose fastener 83 configured to fasten the hose connector 82 to the hydraulic structure 12. For example, the hose connector 82 includes a banjo, and the hose fastener 83 includes a banjo bolt. The hose fastener 83 is threadedly engaged with the first passageway 15A of the hydraulic passageway 15. The hose connector 82 and the hose fastener 83 connect the interior space 74 of the hydraulic device 10C to the interior space 14 of the hydraulic device 10A. The hose connector 82 and the hose fastener 83 can include structures such as a straight hose connector instead of the banjo and the banjo bolt.

The hydraulic device 10A comprises a release member 84. The release member 84 is attached to the hydraulic structure 12 so as to be exposed to the interior space 14 and the atmosphere 8. In this embodiment, the release member 84 is provided on the base member 18. The release member 84 is attached to the base member 18 so as to be exposed to the interior space 14 and the atmosphere 8. However, the release member 84 can be provided on another part of the hydraulic structure 12.

The release member 84 is configured to release air from the interior space 14 toward the atmosphere 8 in accordance with an internal pressure of the interior space 14. In more detail, the release member 84 is configured to release or bleed air from the interior space 14 toward the atmosphere 8 without releasing or bleeding the hydraulic fluid from the interior space 14 toward the atmosphere 8, in accordance with the internal pressure of the interior space 14. Namely, the release member 84 includes a gas permeable filter with hydraulic pressure resistance.

The release member 84 is configured to release air from the interior space 14 toward the atmosphere 8 in a case where the internal pressure of the interior space 14 is higher than a threshold pressure. For example, the threshold pressure is lower than a maximum working pressure of the hydraulic device 10A. The threshold pressure is equal to or higher than 5 atmospheric pressures. Under the usual usage environment, the atmosphere 8 has approximately 1 atmospheric pressure. Thus, the release member 84 is configured to release air from the interior space 14 toward the atmosphere 8 in a case where the difference between the internal pressure of the interior space 14 and the external pressure of the atmosphere 8 is higher than a threshold pressure difference which is equal to or larger than 4 atmospheric pressures.

In this embodiment, the release member 84 is made of a porous material. The release member 84 has porosity corresponding to the threshold pressure. Namely, it is possible to adjust the threshold pressure to a preferable pressure by changing the porosity of the release member 84. For example, the release member 84 is made of porous ceramics. However, the release member 84 can be made of a porous metallic material and/or a porous non-metallic material such as a porous resin material. The release member 84 can be made of another material other than the porous material.

The seal member 21 is provided between the piston 16 and the cylinder bore 20 without contacting the release member 84. The additional seal member 31 is provided between the additional piston 26 and the additional cylinder bore 30 without contacting the release member 84. However, the seal member 21 can be provided to be contactable with the release member 84. The additional seal member 31 can be provided to be contactable with the release member 84. The seal member 21 can be omitted from the hydraulic structure 12. The additional seal member 31 can be omitted from the hydraulic structure 12.

Figure 5:
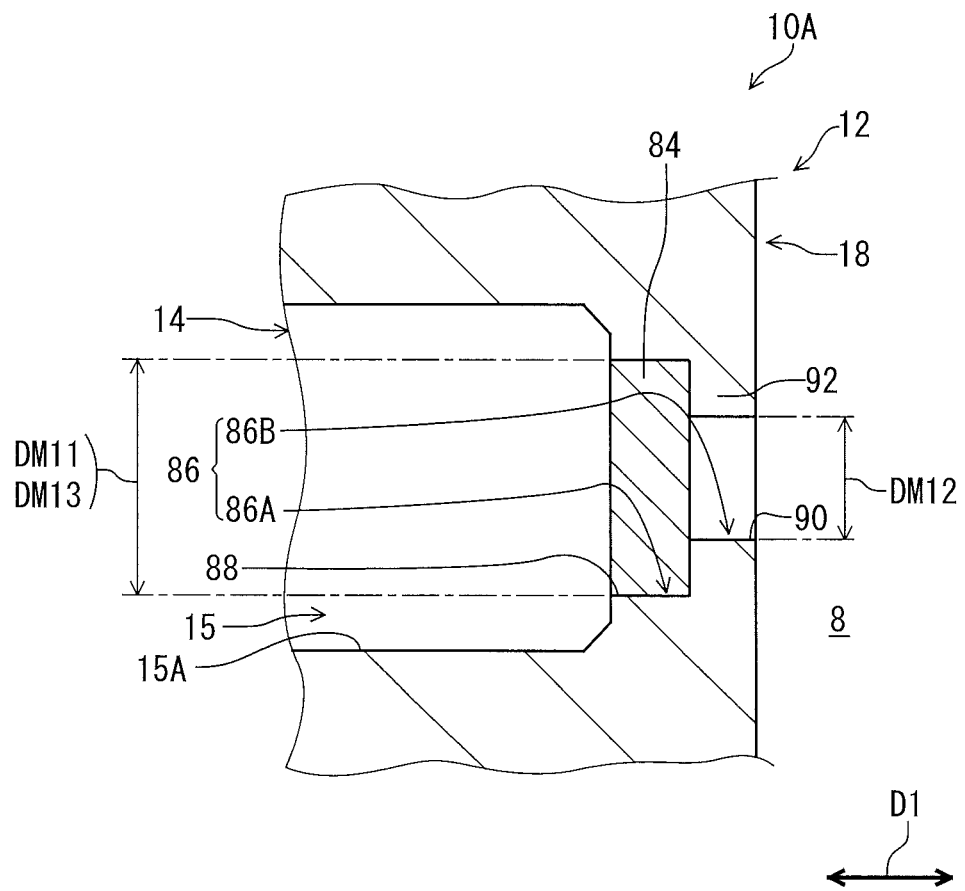
FIG. 5 is a partial cross-sectional view of the hydraulic device illustrated in FIG. 2.

As seen in FIG. 5, the hydraulic structure 12 has an attachment hole 86 extending from the interior space 14 toward the atmosphere 8. The attachment hole 86 extends from the hydraulic passageway 15 toward the atmosphere 8. The release member 84 is provided in the attachment hole 86. The attachment hole 86 is provided as a through-hole having a first end opening 88 and a second end opening 90. The first end opening 88 faces the interior space 14. The second end opening 90 faces the atmosphere 8. In other words, the first end opening 88 is directed toward the interior space 14, and the second end opening 90 is directed toward the atmosphere 8. Namely, the first end opening 88 can also be referred to as an internal end opening 88. The second end opening 90 can also be referred to as an external end opening 90.

The first end opening 88 has a first diameter DM11. The second end opening 90 has a second diameter DM12 smaller than the first diameter DM11. The release member 84 includes an outer diameter DM13. The outer diameter DM13 of the release member 84 is substantially equal to the first diameter DM11 of the first end opening 88. The outer diameter DM13 of the release member 84 is larger than the second diameter DM12 of the second end opening 90. In this embodiment, the release member 84 has a columnar shape. However, the shape of the release member 84 is not limited to this embodiment.

In this embodiment, the attachment hole 86 includes a first hole 86A and a second hole 86B. The first hole 86A includes the first end opening 88 and has the first diameter DM11. The second hole 86B includes the second end opening 90 and has the second diameter DM12. The first hole 86A is connected to the second hole 86B to provide the through-hole. The release member 84 is provided in the first hole 86A. The base member 18 includes a restriction part 92. The restriction part 92 includes the second hole 86B and the second end opening 90. The release member 84 is in contact with the restriction part 92.

The release member 84 is replaceably attached to the hydraulic structure 12. In this embodiment, the release member 84 is press-fitted in the attachment hole 86. The release member 84 is press-fitted in the first hole 86A. For example, the release member 84 is detachable from the hydraulic structure 12 (e.g., the base member 18) by pressing the release member 84 from the atmosphere 8 via the second end opening 90.

As seen in FIG. 3, the hydraulic device 10B comprises a release member 94. The release member 94 has substantially the same structure as that of the release member 84 of the hydraulic device 10A. Same as the release member 84, the release member 94 is configured to release air from the interior space 44 toward the atmosphere 8 in accordance with an internal pressure of the interior space 44. Namely, the release member 94 includes a gas permeable filter with hydraulic pressure resistance. The release member 94 is attached to the hydraulic structure 42 so as to be exposed to the interior space 44 and the atmosphere 8. In this embodiment, the release member 94 is provided on the base member 48. The release member 94 is attached to the base member 48 so as to be exposed to the interior space 44 and the atmosphere 8. However, the release member 94 can be provided on another part of the hydraulic structure 42.

The release member 94 is configured to release air from the interior space 44 toward the atmosphere 8 in a case where the internal pressure of the interior space 44 is higher than a threshold pressure. For example, the threshold pressure is lower than a maximum working pressure of the hydraulic device 10B. The threshold pressure is equal to or higher than 5 atmospheric pressures. Under the usual usage environment, the atmosphere 8 has approximately 1 atmospheric pressure. Thus, the release member 94 is configured to release air from the interior space 44 toward the atmosphere 8 in a case where the difference between the internal pressure of the interior space 44 and the external pressure of the atmosphere 8 is higher than a threshold pressure difference which is equal to or larger than 4 atmospheric pressures.

In this embodiment, the release member 94 is made of a porous material. The release member 94 has porosity corresponding to the threshold pressure. Namely, it is possible to adjust the threshold pressure to a preferable pressure by changing the porosity of the release member 94. For example, the release member 94 is made of porous ceramics. However, the release member 94 can be made of a porous metallic material and/or a porous non-metallic material such as a porous resin material. The release member 94 can be made of another material other than the porous material.

The seal member 51 is provided between the piston 46 and the cylinder bore 50 without contacting the release member 94. However, the seal member 51 can be provided to be contactable with the release member 94. The seal member 51 can be omitted from the hydraulic structure 42.

Figure 6:
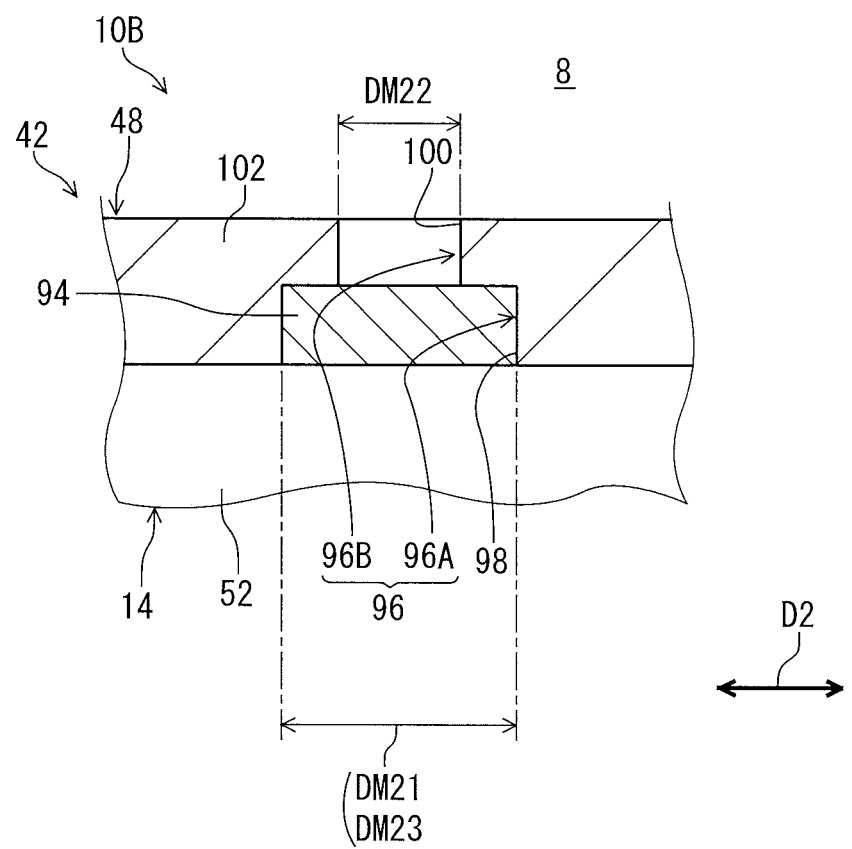
FIG. 6 is a partial cross-sectional view of the hydraulic device illustrated in FIG. 3.

As seen in FIG. 6, the hydraulic structure 42 has an attachment hole 96 extending from the interior space 44 toward the atmosphere 8. The attachment hole 96 extends from the hydraulic passageway 15 toward the atmosphere 8. The release member 94 is provided in the attachment hole 96. The attachment hole 96 is provided as a through-hole having a first end opening 98 and a second end opening 100. The first end opening 98 faces the interior space 44. The second end opening 100 faces the atmosphere 8. In other words, the first end opening 98 is directed toward the interior space 44, and the second end opening 100 is directed toward the atmosphere 8. Namely, the first end opening 98 can also be referred to as an internal end opening 98. The second end opening 100 can also be referred to as an external end opening 100.

The first end opening 98 has a first diameter DM21. The second end opening 100 has a second diameter DM22 smaller than the first diameter DM21. The release member 94 includes an outer diameter DM23. The outer diameter DM23 of the release member 94 is substantially equal to the first diameter DM21 of the first end opening 98. The outer diameter DM23 of the release member 94 is larger than the second diameter DM22 of the second end opening 100. In this embodiment, the release member 94 has a columnar shape. However, the shape of the release member 94 is not limited to this embodiment, In this embodiment, the attachment hole 96 includes a first hole 96A and a second hole 96B. The first hole 96A includes the first end opening 98 and has the first diameter DM21. The second hole 96B includes the second end opening 100 and has the second diameter DM22. The first hole 96A is connected to the second hole 96B to provide the through-hole. The release member 94 is provided in the first hole 96A. The base member 48 includes a restriction part 102. The restriction part 102 includes the second hole 96B and the second end opening 100. The release member 94 is in contact with the restriction part 102.

The release member 94 is replaceably attached to the hydraulic structure 42. In this embodiment, the release member 94 is press-fitted in the attachment hole 96. The release member 94 is press-fitted in the first hole 96A. For example, the release member 94 is detachable from the hydraulic structure 42 (e.g., the base member 48) by pressing the release member 94 from the atmosphere 8 via the second end opening 100.

As seen in FIG. 4, the hydraulic device 10C comprises a release member 104. The release member 104 has substantially the same structure as that of the release member 84 of the hydraulic device 10A. Same as the release member 84, the release member 104 is configured to release air from the interior space 74 toward the atmosphere 8 in accordance with an internal pressure of the interior space 74. Namely, the release member 104 includes a gas permeable filter with hydraulic pressure resistance. The release member 104 is attached to the hydraulic structure 72 so as to be exposed to the interior space 74 and the atmosphere 8. In this embodiment, the release member 104 is provided on the flexible hose member 76. The release member 104 is attached to the flexible hose member 76 so as to be exposed to the interior space 74 and the atmosphere 8. However, the release member 104 can be provided on another part of the hydraulic structure 72.

The release member 104 is configured to release air from the interior space 74 toward the atmosphere 8 in a case where the internal pressure of the interior space 74 is higher than a threshold pressure. For example, the threshold pressure is lower than a maximum working pressure of the hydraulic device 10C. The threshold pressure is equal to or higher than 5 atmospheric pressures. Under the usual usage environment, the atmosphere 8 has approximately 1 atmospheric pressure. Thus, the release member 104 is configured to release air from the interior space 74 toward the atmosphere 8 in a case where the difference between the internal pressure of the interior space 74 and the external pressure of the atmosphere 8 is higher than a threshold pressure difference which is equal to or larger than 4 atmospheric pressures.

In this embodiment, the release member 104 is made of a porous material. The release member 104 has porosity corresponding to the threshold pressure. Namely, it is possible to adjust the threshold pressure to a preferable pressure by changing the porosity of the release member 104. For example, the release member 104 is made of porous ceramics. However, the release member 104 can be made of a porous metallic material and/or a porous non-metallic material such as a porous resin material. The release member 104 can be made of another material other than the porous material.

Figure 7:
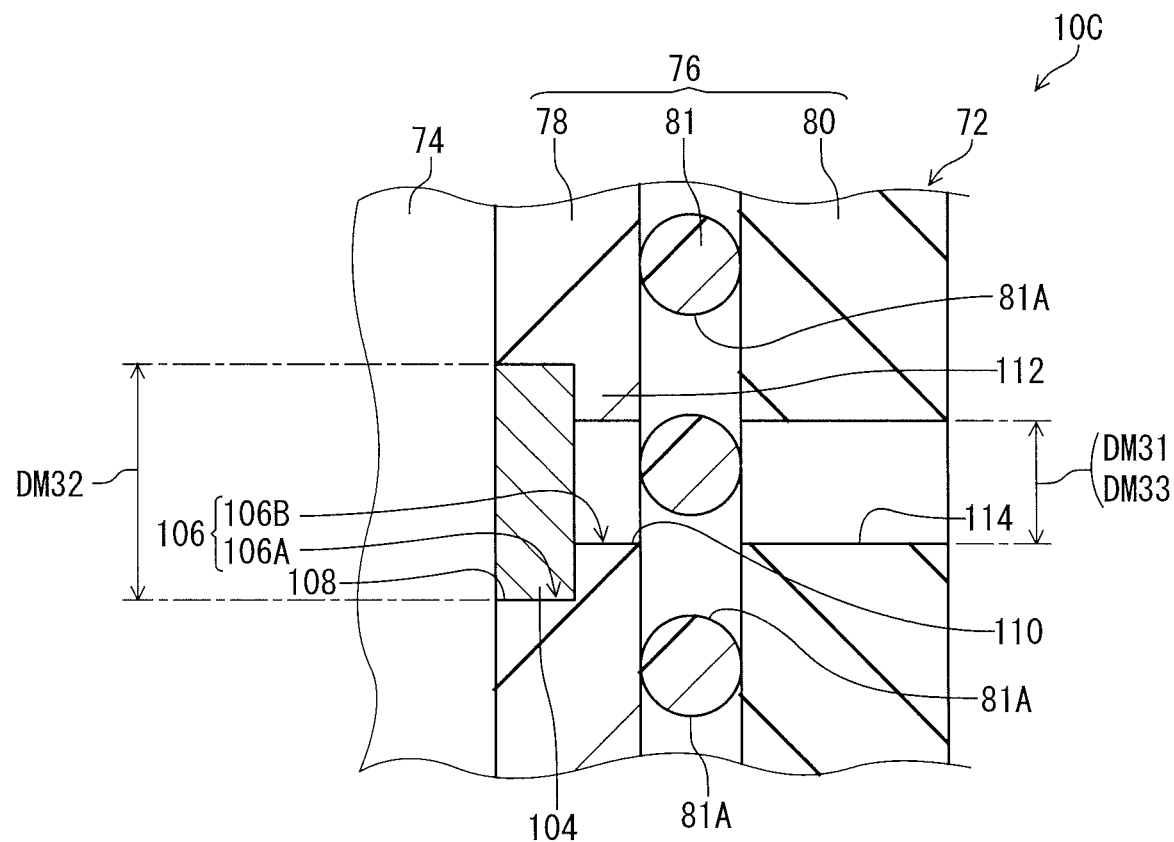
FIG. 7 is a partial cross-sectional view of the hydraulic device illustrated in FIG. 4.

As seen in FIG. 7, the hydraulic structure 72 has an attachment hole 106 extending from the interior space 74 toward the atmosphere 8. The attachment hole 106 extends from the hydraulic passageway 15 toward the atmosphere 8. In this embodiment, the inner tube 78 includes the attachment hole 106. However, the outer tube 80 can include the attachment hole 106. The release member 104 is provided in the attachment hole 106. The attachment hole 106 is provided as a through-hole having a first end opening 108 and a second end opening 110. The first end opening 108 faces the interior space 74. The second end opening 110 faces the atmosphere 8. In other words, the first end opening 108 is directed toward the interior space 74, and the second end opening 110 is directed toward the atmosphere 8. Namely, the first end opening 108 can also be referred to as an internal end opening 108. The second end opening 110 can also be referred to as an external end opening 110.

The first end opening 108 has a first diameter DM31. The second end opening 110 has a second diameter DM32 smaller than the first diameter DM31. The release member 104 includes an outer diameter DM33. The outer diameter DM33 of the release member 104 is substantially equal to the first diameter DM31 of the first end opening 108. The outer diameter DM33 of the release member 104 is larger than the second diameter DM32 of the second end opening 110. In this embodiment, the release member 104 has a columnar shape. However, the shape of the release member 104 is not limited to this embodiment.

In this embodiment, the attachment hole 106 includes a first hole 106A and a second hole 106B. The first hole 106A includes the first end opening 108 and has the first diameter DM31. The second hole 106B includes the second end opening 110 and has the second diameter DM32. The first hole 106A is connected to the second hole 106B to provide the through-hole. The release member 104 is provided in the first hole 106A. The hydraulic structure 72 includes a restriction part 112. The restriction part 112 includes the second hole 106B and the second end opening 110. The release member 104 is in contact with the restriction part 112.

The hydraulic structure 72 has a connection hole 114 extending from atmosphere 8 toward the release member 104. In this embodiment, the outer tube 80 includes the connection hole 114. The intermediate layer 81 has mesh openings 81A. The release member 104 is attached to the inner tube 78 so as to be exposed to the interior space 74 through the connection hole 114 and at least one of the mesh openings 81A.

The release member 104 is replaceably attached to the hydraulic structure 72. In this embodiment, the release member 104 is press-fitted in the attachment hole 106. The release member 104 is press-fitted in the first hole 106A. For example, the release member 104 is detachable from the hydraulic structure 72 by pressing the release member 104 from the atmosphere 8 via the second end opening 110 and the connection hole 114.

In the hydraulic device 10B illustrated in FIG. 3, the fluid is pushed out from the interior space 44 to the interior space 74 (FIG. 4) of the hydraulic device 10C by the piston 46 when the user operates the operating member 58 of the hydraulic device 10B from the rest position P21 toward the operated position P22. In the hydraulic device 10A illustrated in FIG. 2, the fluid flows into the interior space 14 of the hydraulic device 10A via the hydraulic device 10C, increasing the internal pressure of the interior space 14. This moves the piston 16 toward the disc rotor 7 and moves the additional piston 26 toward the disc rotor 7. Even if air is unintentionally mixed in the fluid filled in the interior space 14, the release member 84 releases the mixed air from the interior space 14 toward the atmosphere 8 in a case where the internal pressure of the interior space 14 is higher than the threshold pressure. Accordingly, it is possible to remove air from the interior space 14 of the hydraulic device 10A in use of the hydraulic device 10A. It is possible to remove air from the interior space 44 of the hydraulic device 10B in use of the hydraulic device 10B. It is possible to remove air from the interior space 74 of the hydraulic device 10C in use of the hydraulic device 10C.

Second Embodiment

A hydraulic device 210A in accordance with a second embodiment will be described below referring to FIGS. 8 to 10. The hydraulic device 210A has the same structure and/or configuration as those of the hydraulic device 10A except for the arrangement of the release member 84. Thus, elements having substantially the same function as those in the first embodiment will be numbered the same here and will not be described and/or illustrated again in detail here for the sake of brevity.

Figure 8:
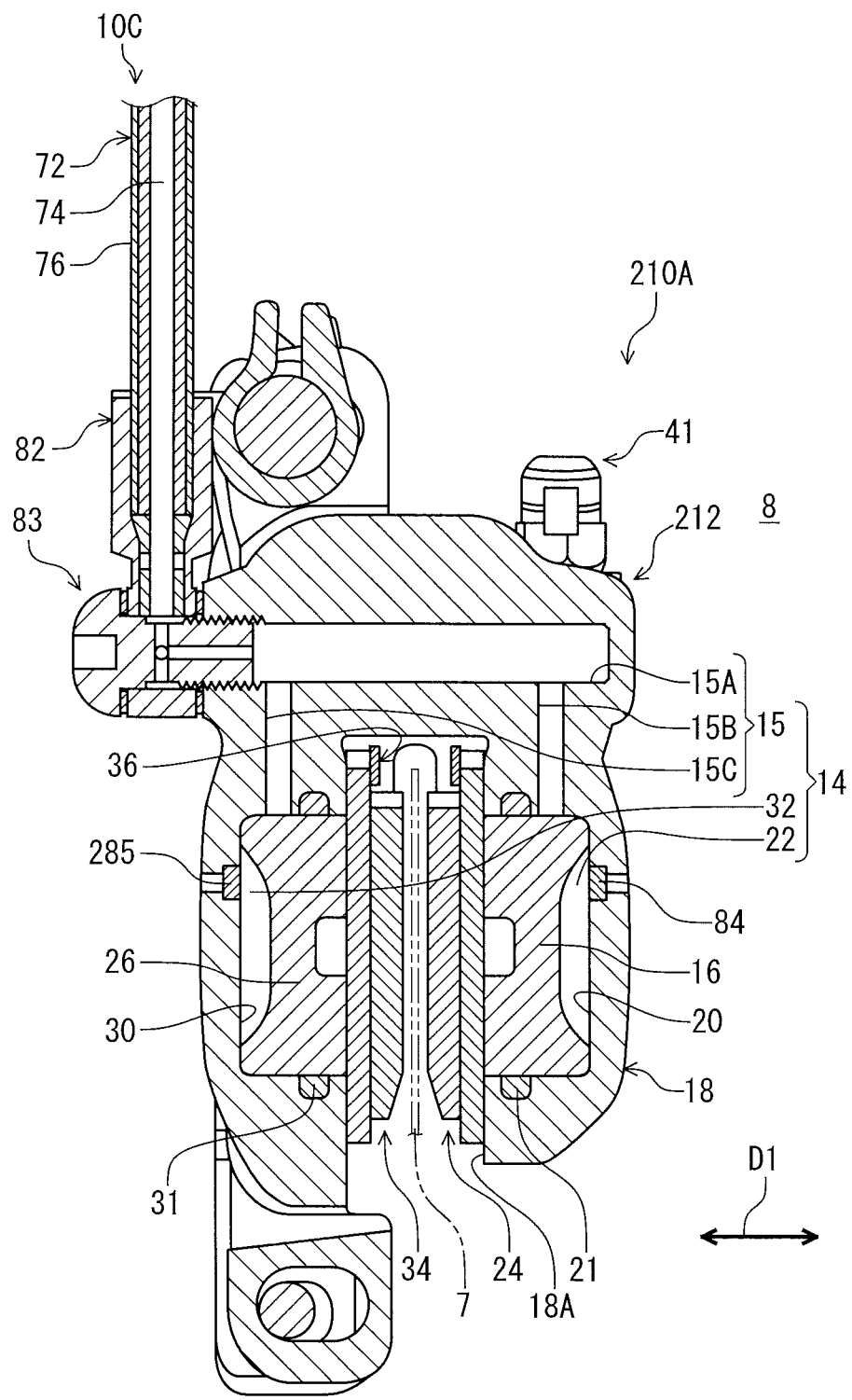
FIG. 8 is a cross-sectional view of a hydraulic device in accordance with a second embodiment.

As seen in FIG. 8, the hydraulic device 210A comprises a hydraulic structure 212 and the release member 84. The hydraulic structure 212 includes the interior space 14 in which the fluid is to be filled. The release member 84 is attached to the hydraulic structure 212 so as to be exposed to the interior space 14 and the atmosphere 8. The hydraulic structure 212 includes a base member 218. The base member 218 has substantially the same structure as that of the base member 18 of the first embodiment. The arrangement of the release member 84 in the hydraulic device 210A is different from the arrangement of the release member 84 in the hydraulic device 10A of the first embodiment.

In this embodiment, the release member 84 is provided on the base member 218. The release member 84 is attached to the base member 218 so as to be exposed to the piston chamber 22. The release member 84 partly defines the piston chamber 22. The release member 84 is configured to release air from the interior space 14 toward the atmosphere 8 in accordance with the internal pressure of the interior space 14 (e.g., the piston chamber 22). The release member 84 is configured to release air from the interior space 14 toward the atmosphere 8 in the case where the internal pressure of the interior space 14 (e.g., the piston chamber 22) is higher than the threshold pressure.

The hydraulic device 210A further comprises an additional release member 285. The additional release member 285 has substantially the same structure as that of the release member 84 of the first embodiment. The additional release member 285 is attached to the hydraulic structure 212 so as to be exposed to the interior space 14 and the atmosphere 8. The additional release member 285 is provided on the base member 218. The additional release member 285 is attached to the base member 218 so as to be exposed to the additional piston chamber 32. The additional release member 285 partly defines the additional piston chamber 32. The additional release member 285 is configured to release air from the interior space 14 toward the atmosphere 8 in accordance with the internal pressure of the interior space 14 (e.g., the additional piston chamber 32). Namely, the additional release member 285 includes a gas permeable filter with hydraulic pressure resistance. The additional release member 285 is configured to release air from the interior space 14 toward the atmosphere 8 in the case where the internal pressure of the interior space 14 (e.g., the additional piston chamber 32) is higher than the threshold pressure.

Figure 9:
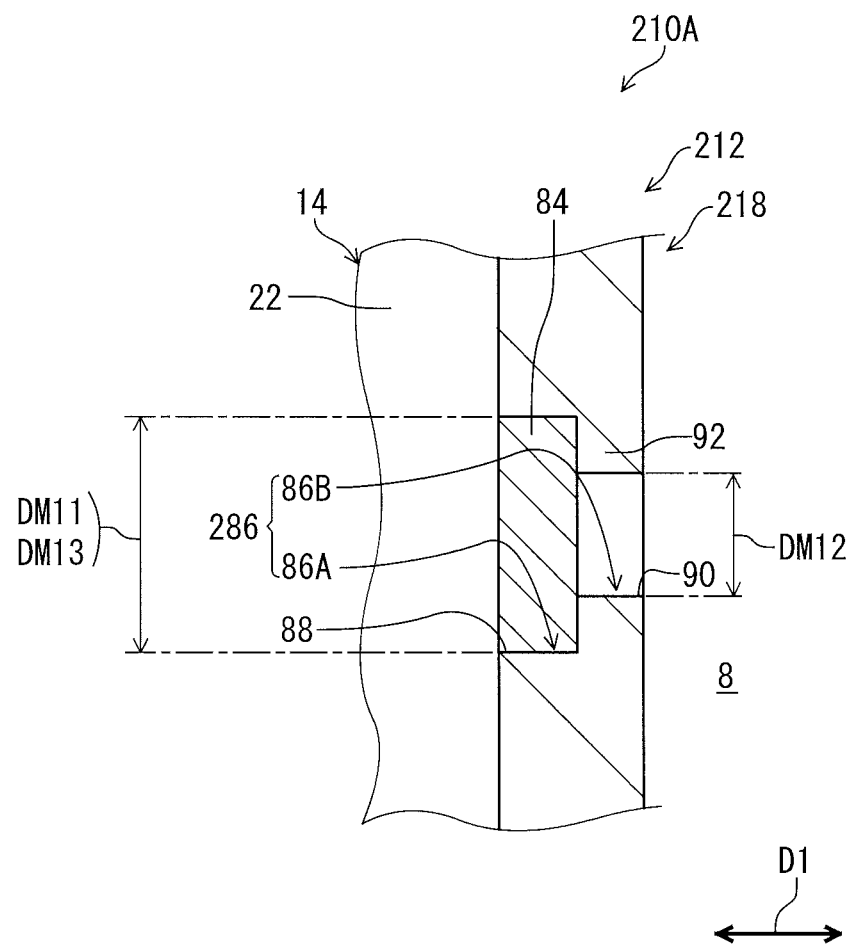
FIG. 9 is a partial cross-sectional view of the hydraulic device illustrated in FIG. 8.

As seen in FIG. 9, the hydraulic structure 212 has an attachment hole 286 extending from the interior space 14 toward the atmosphere 8. In this embodiment, the base member 218 includes the attachment hole 286. The attachment hole 286 extends from the piston chamber 22 toward the atmosphere 8. The release member 84 is provided in the attachment hole 286. The attachment hole 286 has substantially the same structure as that of the attachment hole 86 of the first embodiment. Thus, it will not be described in detail here for the sake of brevity.

The release member 84 is replaceably attached to the hydraulic structure 212. In this embodiment, the release member 84 is press-fitted in the attachment hole 286. The release member 84 is press-fitted in the first hole 86A. For example, the release member 84 is detachable from the hydraulic structure 212 by pressing the release member 84 from the atmosphere 8 via the second end opening 90. However, the release member 84 can be attached to the hydraulic structure 212 with another structure such as adhesive instead of or in addition to press-fitting.

Figure 10:
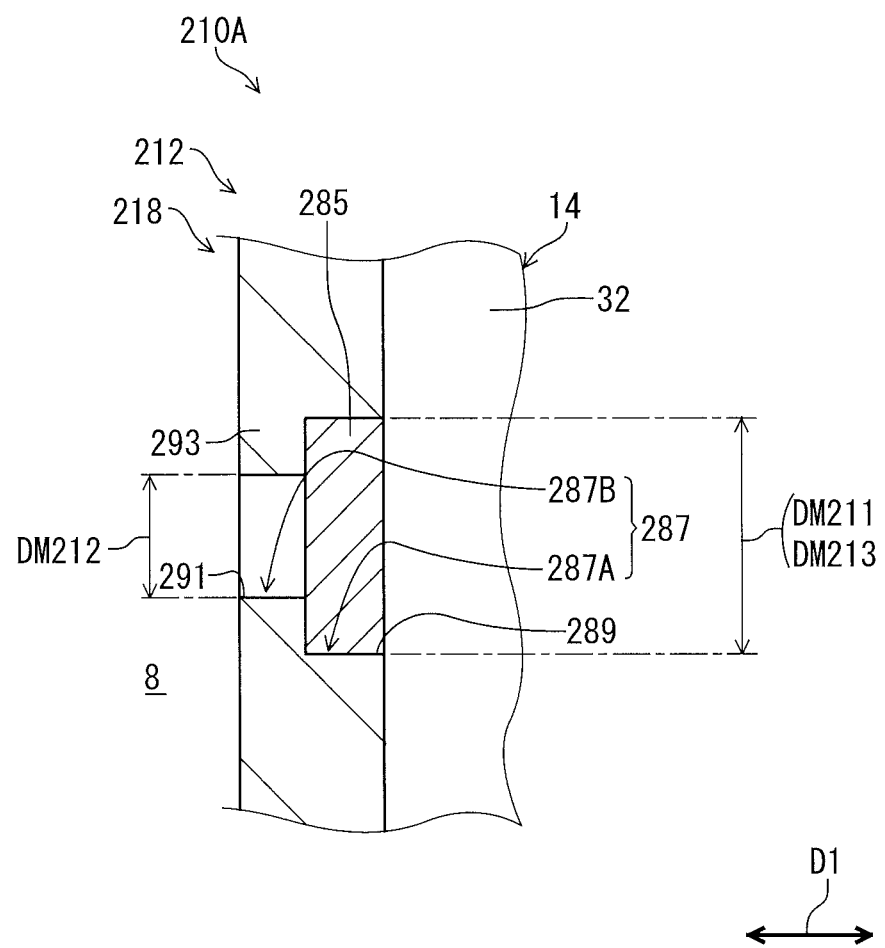
FIG. 10 is another partial cross-sectional view of the hydraulic device illustrated in FIG. 8.

As seen in FIG. 10, the hydraulic structure 212 has an additional attachment hole 287 extending from the interior space 14 toward the atmosphere 8. The additional attachment hole 287 extends from the additional piston chamber 32 toward the atmosphere 8. The additional release member 285 is provided in the additional attachment hole 287. The additional attachment hole 287 is provided as a through-hole having a first additional end opening 289 and a second additional end opening 291. The first additional end opening 289 faces the interior space 14. The second additional end opening 291 faces the atmosphere 8. Namely, the first additional end opening 289 can also be referred to as an internal additional end opening 289. The second additional end opening 291 can also be referred to as an external additional end opening 291.

The first additional end opening 289 has a first additional diameter DM211. The second additional end opening 291 has a second additional diameter DM212 smaller than the first additional diameter DM211. The additional release member 285 includes an outer additional diameter DM213. The outer additional diameter DM213 of the additional release member 285 is substantially equal to the first additional diameter DM211 of the first additional end opening 289. The outer additional diameter DM213 of the additional release member 285 is larger than the second additional diameter DM212 of the second additional end opening 291.

In this embodiment, the additional attachment hole 287 includes a first additional hole 287A and a second additional hole 287B. The first additional hole 287A includes the first additional end opening 289 and has the first additional diameter DM211. The second additional hole 287B includes the second additional end opening 291 and has the second additional diameter DM212. The first additional hole 287A is connected to the second additional hole 287B to provide the through-hole. The additional release member 285 is provided in the first additional hole 287A. The base member 218 includes an additional restriction part 293. The additional restriction part 293 includes the second additional hole 287B and the second additional end opening 291. The additional release member 285 is in contact with the additional restriction part 293. In this embodiment, the additional attachment hole 287 has substantially the same structure as that of the attachment hole 286. However, the structure of the additional attachment hole 287 can be different from that of the attachment hole 286.

The additional release member 285 is replaceably attached to the hydraulic structure 212. In this embodiment, the additional release member 285 is press-fitted in the additional attachment hole 287. The additional release member 285 is press-fitted in the first additional hole 287A. For example, the additional release member 285 is detachable from the hydraulic structure 212 by pressing the additional release member 285 from the atmosphere 8 via the second additional end opening 291. However, the additional release member 285 can be attached to the hydraulic structure 212 with another structure such as adhesive instead of or in addition to press-fitting.

Third Embodiment

A hydraulic device 310A in accordance with a third embodiment will be described below referring to FIGS. 11 to 13. The hydraulic device 310A has the same structure and/or configuration as those of the hydraulic device 210A except for the arrangement of the release member 84 and the additional release member 285. Thus, elements having substantially the same function as those in the above embodiments will be numbered the same here and will not be described and/or illustrated again in detail here for the sake of brevity.

Figure 11:
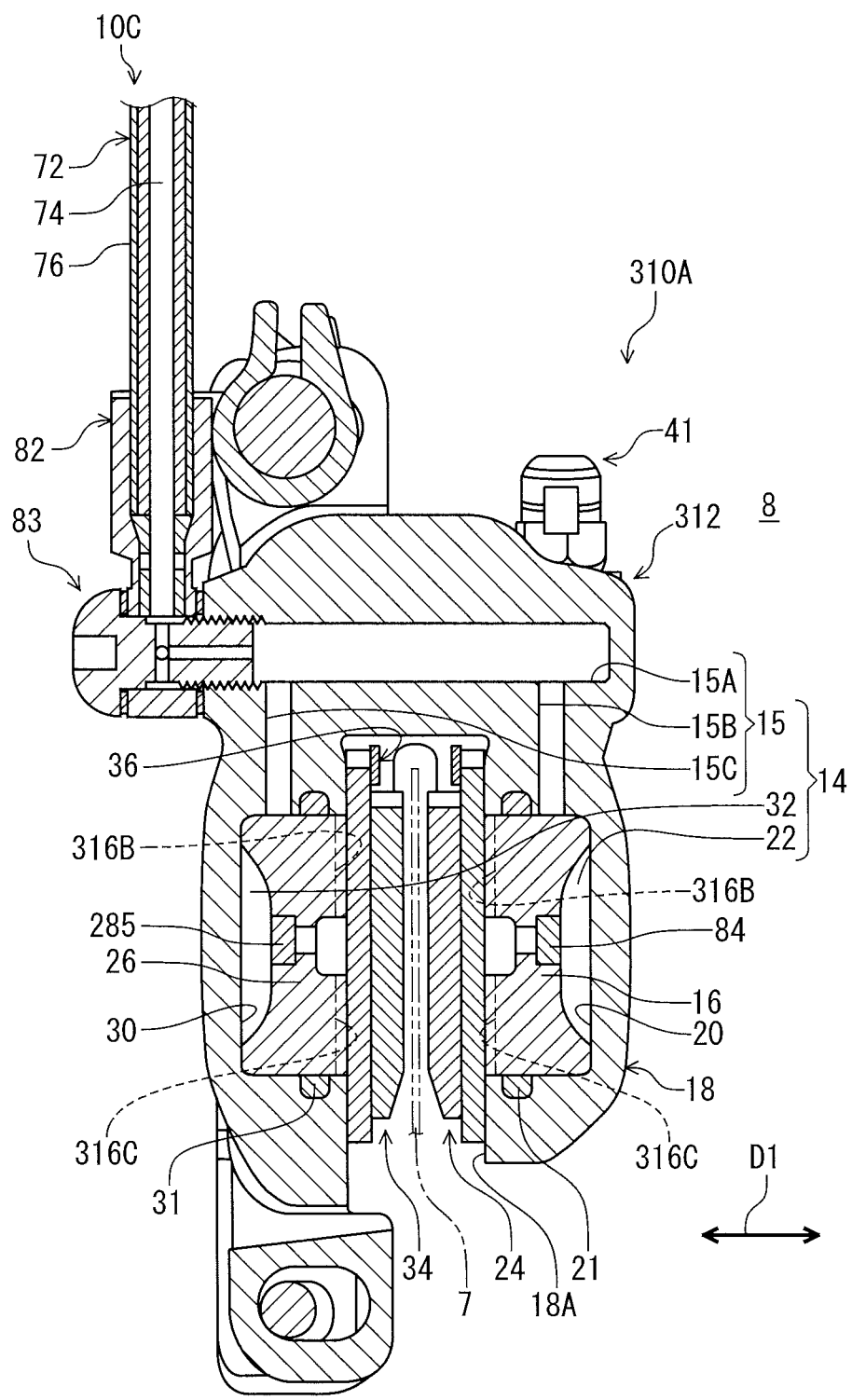
FIG. 11 is a cross-sectional view of a hydraulic device in accordance with a third embodiment.

As seen in FIG. 11, the hydraulic device 310A comprises a hydraulic structure 312, the release member 84, and the additional release member 285. The hydraulic structure 312 includes the interior space 14 in which the fluid is to be filled. The release member 84 is attached to the hydraulic structure 312 so as to be exposed to the interior space 14 and the atmosphere 8. The hydraulic structure 312 includes a piston 316, an additional piston 326, and a base member 318. The piston 316 has substantially the same structure as that of the piston 16 of the second embodiment. The additional piston 326 has substantially the same structure as that of the additional piston 26 of the second embodiment.

The base member 318 has substantially the same structure as that of the base member 218 of the second embodiment. The arrangement of the release member 84 in the hydraulic device 310A is different from the arrangement of the release member 84 in the hydraulic device 210A of the second embodiment.

In this embodiment, the release member 84 is provided on the piston 316. The release member 84 is attached to the piston 316 so as to be exposed to the piston chamber 22. The release member 84 partly defines the piston chamber 22. The release member 84 is configured to release air from the interior space 14 toward the atmosphere 8 in accordance with the internal pressure of the interior space 14 (e.g., the piston chamber 22). The release member 84 is configured to release air from the interior space 14 toward the atmosphere 8 in the case where the internal pressure of the interior space 14 (e.g., the piston chamber 22) is higher than the threshold pressure.

The additional release member 285 is provided on the additional piston 326. The additional release member 285 is attached to the additional piston 326 so as to be exposed to the additional piston chamber 32. The additional release member 285 partly defines the additional piston chamber 32. The additional release member 285 is configured to release air from the interior space 14 toward the atmosphere 8 in accordance with the internal pressure of the interior space 14 (e.g., the additional piston chamber 32). The additional release member 285 is configured to release air from the interior space 14 toward the atmosphere 8 in the case where the internal pressure of the interior space 14 (e.g., the additional piston chamber 32) is higher than the threshold pressure.

The seal member 21 is provided between the piston 316 and the cylinder bore 20 without contacting the release member 84. The additional seal member 31 is provided between the additional piston 326 and the additional cylinder bore 30 without contacting the release member 84. The seal member 21 is provided between the piston 316 and the cylinder bore 20 without contacting the additional release member 285. The additional seal member 31 is provided between the additional piston 326 and the additional cylinder bore 30 without contacting the additional release member 285.

Figure 12:
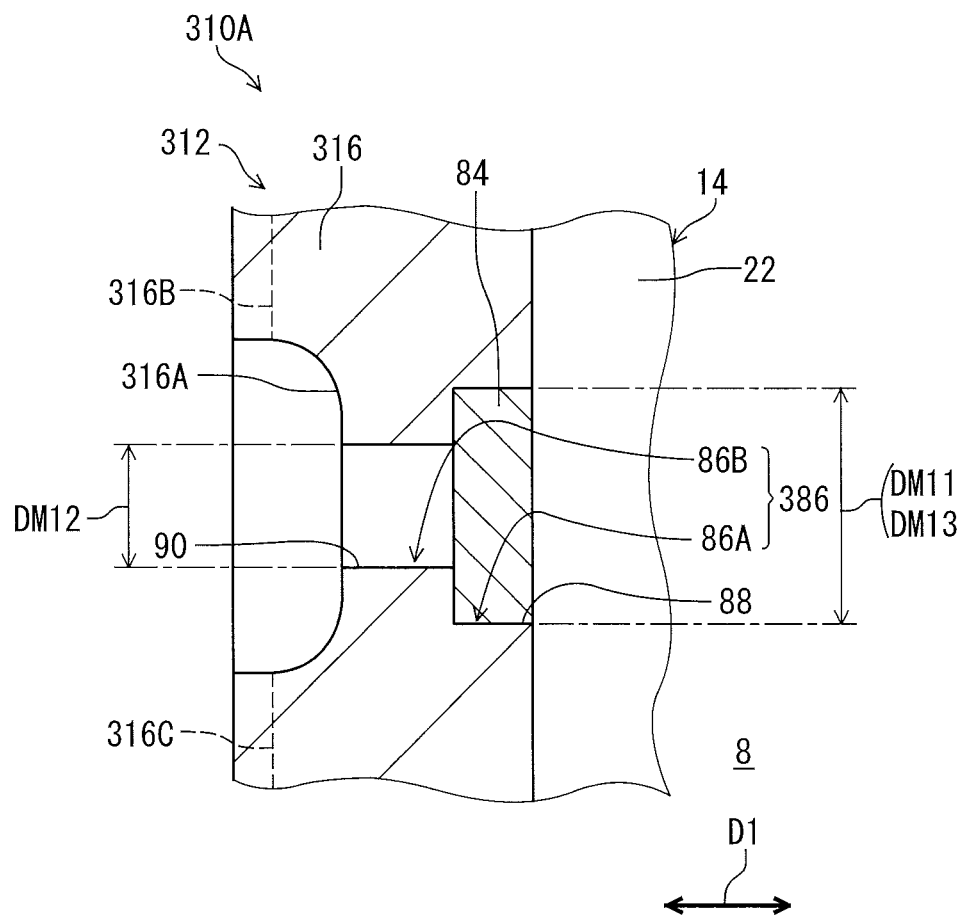
FIG. 12 is a partial cross-sectional view of the hydraulic device illustrated in FIG. 11.

As seen in FIG. 12, the hydraulic structure 312 has an attachment hole 386 extending from the interior space 14 toward the atmosphere 8. In this embodiment, the piston 316 includes the attachment hole 386. The attachment hole 386 extends from the piston chamber 22 toward the atmosphere 8. The atmosphere 8 includes the slit 18A (FIG. 11) of the base member 318. The attachment hole 386 extends from the piston chamber 22 toward the slit 18A of the atmosphere 8. The piston 316 includes a recess 316A, a groove 316B, and a groove 316C. The grooves 316B and 316C extend from the recess 316A to connect the recess 316A to the atmosphere 8. The release member 84 is provided in the attachment hole 386. The attachment hole 386 has substantially the same structure as that of the attachment hole 286 (i.e., the attachment hole 86) of the second embodiment. Thus, it will not be described in detail here for the sake of brevity.

The release member 84 is replaceably attached to the hydraulic structure 312. In this embodiment, the release member 84 is press-fitted in the attachment hole 386. The release member 84 is press-fitted in the first hole 86A. For example, the release member 84 is detachable from the hydraulic structure 312 (e.g., the piston 316) by pressing the release member 84 from the atmosphere 8 via the second end opening 90. However, the release member 84 can be attached to the hydraulic structure 312 with another structure such as adhesive instead of or in addition to press-fitting.

Figure 13:
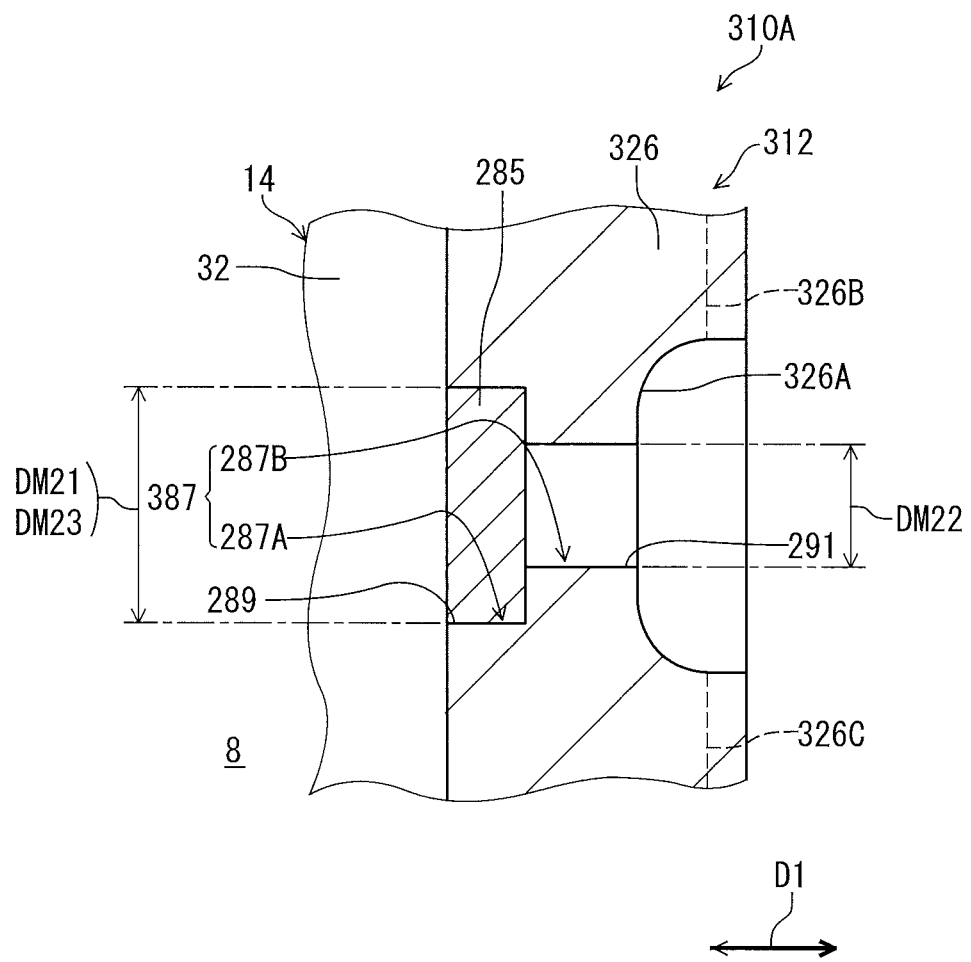
FIG. 13 is another partial cross-sectional view of the hydraulic device illustrated in FIG. 11.

As seen in FIG. 13, the hydraulic structure 312 has an additional attachment hole 387 extending from the interior space 14 toward the atmosphere 8. In this embodiment, the additional piston 326 includes the additional attachment hole 387. The additional attachment hole 387 extends from the piston chamber 22 toward the atmosphere 8. The atmosphere 8 includes the slit 18A (FIG. 11) of the base member 318. The additional attachment hole 387 extends from the piston chamber 22 toward the slit 18A of the atmosphere 8. The piston 316 includes a recess 316A, a groove 316B, and a groove 316C. The grooves 316B and 316C extend from the recess 316A to connect the recess 316A to the atmosphere 8. The additional release member 285 is provided in the additional attachment hole 387. The additional attachment hole 387 has substantially the same structure as that of the additional attachment hole 287 of the second embodiment. Thus, it will not be described in detail here for the sake of brevity.

The additional release member 285 is replaceably attached to the hydraulic structure 312. In this embodiment, the additional release member 285 is press-fitted in the additional attachment hole 387. The additional release member 285 is press-fitted in the first additional hole 287A. For example, the additional release member 285 is detachable from the hydraulic structure 312 (e.g., the additional piston 326) by pressing the additional release member 285 from the atmosphere 8 via the second additional end opening 291. However, the additional release member 285 can be attached to the hydraulic structure 312 with another structure such as adhesive instead of or in addition to press-fitting.

Fourth Embodiment

A hydraulic device 410B in accordance with a fourth embodiment will be described below referring to FIGS. 14 and 15. The hydraulic device 410B has the same structure and/or configuration as those of the hydraulic device 10B except for the arrangement of the release member 94. Thus, elements having substantially the same function as those in the above embodiments will be numbered the same here and will not be described and/or illustrated again in detail here for the sake of brevity.

Figure 14:
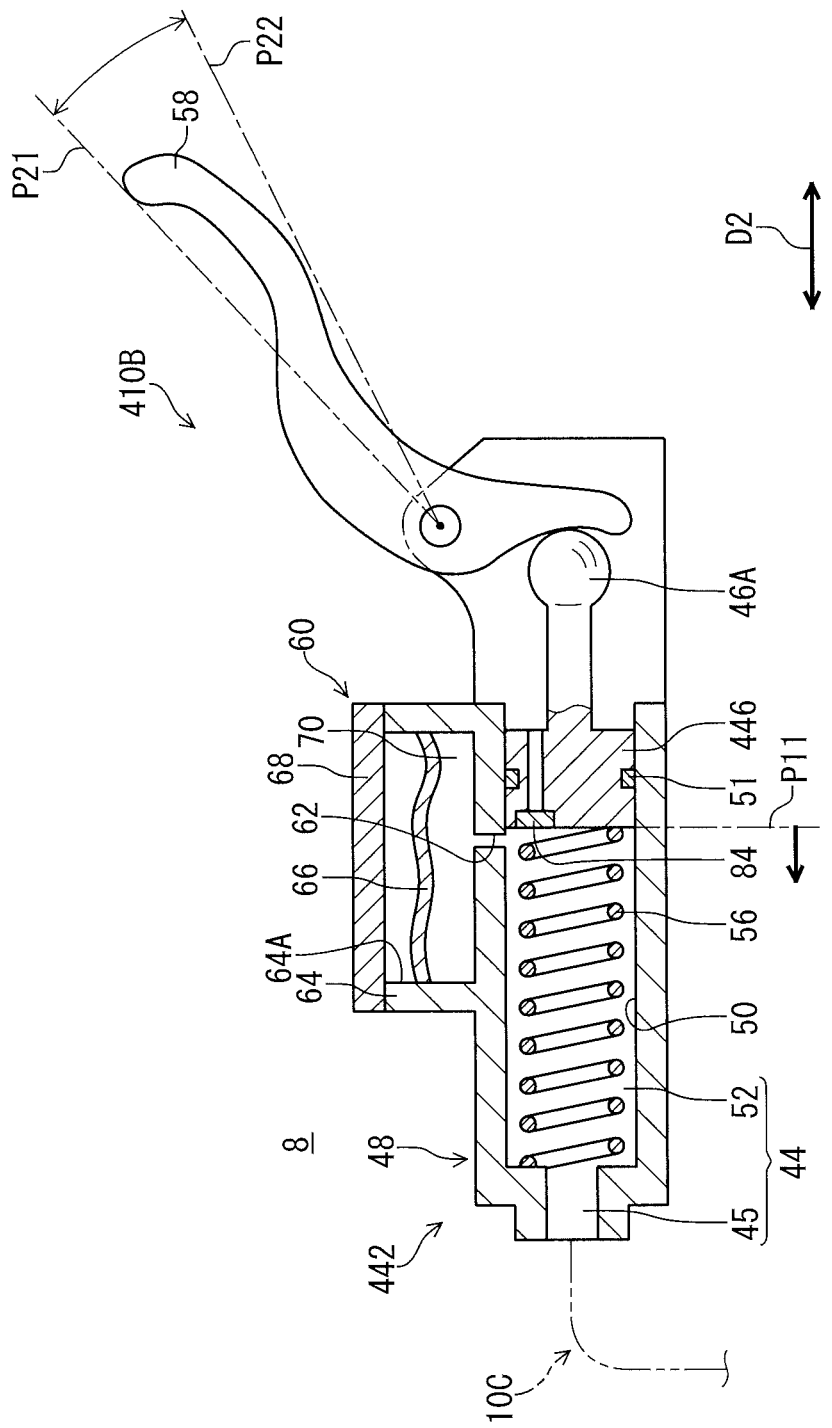
FIG. 14 is a cross-sectional view of a hydraulic device in accordance with a fourth embodiment.

As seen in FIG. 14, the hydraulic device 410B comprises a hydraulic structure 442 and the release member 94. The hydraulic structure 442 includes the interior space 44 in which the fluid is to be filled. The release member 94 is attached to the hydraulic structure 442 so as to be exposed to the interior space 44 and the atmosphere 8. The hydraulic structure 312 includes a piston 446 and the base member 48. The piston 446 has substantially the same structure as that of the piston 16 of the second embodiment. The arrangement of the release member 94 in the hydraulic device 410B is different from the arrangement of the release member 94 in the hydraulic device 10B of the first embodiment.

In this embodiment, the release member 94 is provided on the piston 446. The release member 94 is attached to the base member 18 so as to be exposed to the piston chamber 52. The release member 94 partly defines the piston chamber 52. The release member 94 is configured to release air from the interior space 44 toward the atmosphere 8 in accordance with the internal pressure of the interior space 44 (e.g., the piston chamber 52). The release member 94 is configured to release air from the interior space 44 toward the atmosphere 8 in the case where the internal pressure of the interior space 44 (e.g., the piston chamber 52) is higher than the threshold pressure.

Figure 15:
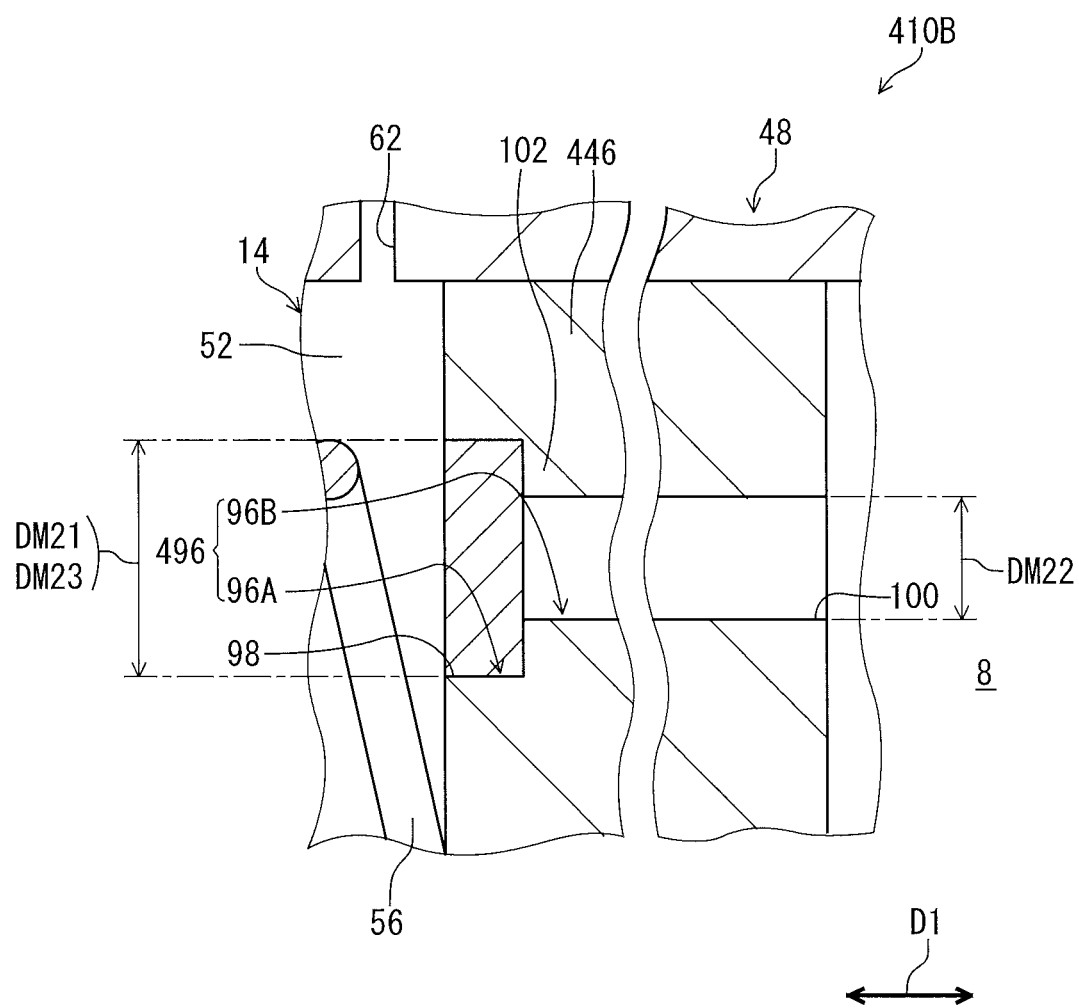
FIG. 15 is a partial cross-sectional view of the hydraulic device illustrated in FIG. 14.

As seen in FIG. 15, the hydraulic structure 442 has an attachment hole 496 extending from the interior space 44 toward the atmosphere 8. In this embodiment, the piston 446 includes the attachment hole 496. The attachment hole 496 extends from the piston chamber 52 toward the atmosphere 8. The release member 94 is provided in the attachment hole 496. The attachment hole 496 has substantially the same structure as that of the attachment hole 496 (i.e., the attachment hole 96) of the fourth embodiment. Thus, it will not be described in detail here for the sake of brevity.

The release member 94 is replaceably attached to the hydraulic structure 442. In this embodiment, the release member 94 is press-fitted in the attachment hole 496. The release member 94 is press-fitted in the first hole 96A. For example, the release member 94 is detachable from the hydraulic structure 442 by pressing the release member 94 from the atmosphere 8 via the second end opening 90. However, the release member 94 can be attached to the hydraulic structure 442 with another structure such as adhesive instead of or in addition to press-fitting.

MODIFICATIONS

As seen in FIGS. 2 to 4, in the first embodiment, the hydraulic devices 10A, 10B, and 10C respectively comprise the release members 84, 94, and 104. However, at least one of the hydraulic devices 10A, 10B, and 10C can comprise the release member, and the remaining of the release members 84, 94, and 104 can be omitted from the remaining of the hydraulic devices 10A, 10B, and 10C.

At least two of the structures of the hydraulic devices in accordance with the above embodiments can be combined with each other. For example, the hydraulic device 10A of the first embodiment can be replaced with the hydraulic device 210A of the second embodiment. The hydraulic device 10A of the first embodiment can be replaced with the hydraulic device 310A of the third embodiment. The hydraulic device 10B of the first embodiment can be replaced with the hydraulic device 410B of the fourth embodiment.

Figure 16:
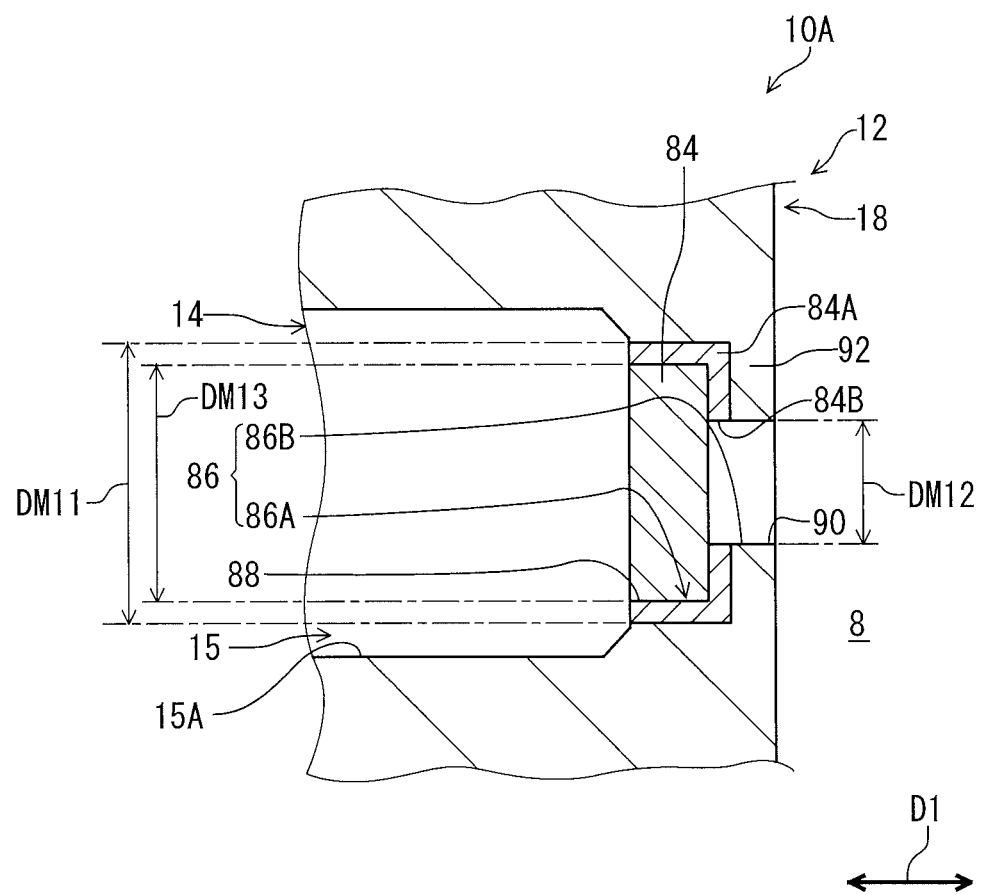
FIG. 16 is a partial cross-sectional view of a hydraulic device in accordance with a modification.

In the above embodiments, the release member is directly provided in the attachment hole. However, the attachment structure of the release member is not limited to the above embodiments. As seen in FIG. 16, for example, the hydraulic device 10A can further comprise an intermediate member 84A provided between the hydraulic structure 12 and the release member 84. In such modification, the release member 84 is embedded in the intermediate member 84A with insert molding. The intermediate member 84A is made of a material different from the material of the release member 84. The intermediate member 84A is made of a non-metallic material such as a resin material. The intermediate member 84A can be an adhesive layer. The outer diameter DM13 of the release member 84 is smaller than the first diameter DM11 of the first hole 86A. The intermediate member 84A includes a third hole 84B connected to the second hole 86B. The attachment structure of the release member 84 illustrated in FIG. 16 can apply to the release member and the additional release member in the hydraulic devices 10B, 10C, 210A, 310A, and 410B.

Figure 17:
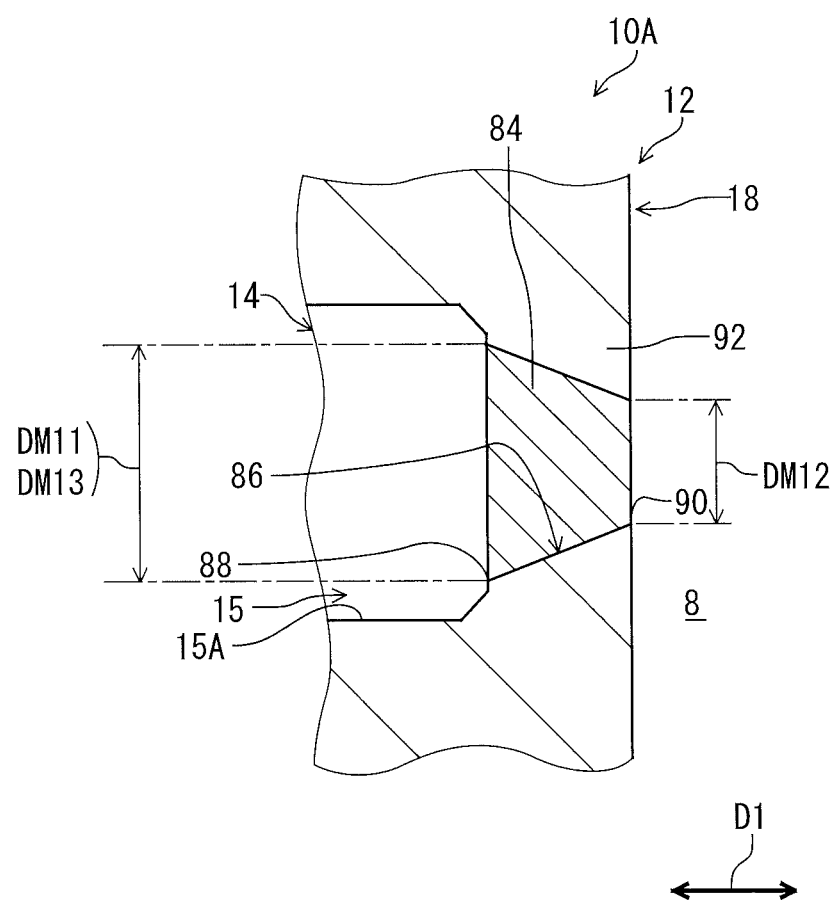
FIG. 17 is a partial cross-sectional view of a hydraulic device in accordance with another modification.

In the above embodiments, the attachment hole includes the first hole and the second hole. However, the structure of the attachment hole is not limited the above embodiment. As seen in FIG. 17, for example, the attachment hole 86 can have a tapered shape. Similarly, the release member 84 can have a tapered shape. The shapes of the release member 84 and the attachment hole 86 illustrated in FIG. 17 can apply to the attachment hole and the additional attachment hole in the hydraulic devices 10B, 10C, 210A, 310A, and 410B.

Figure 18:
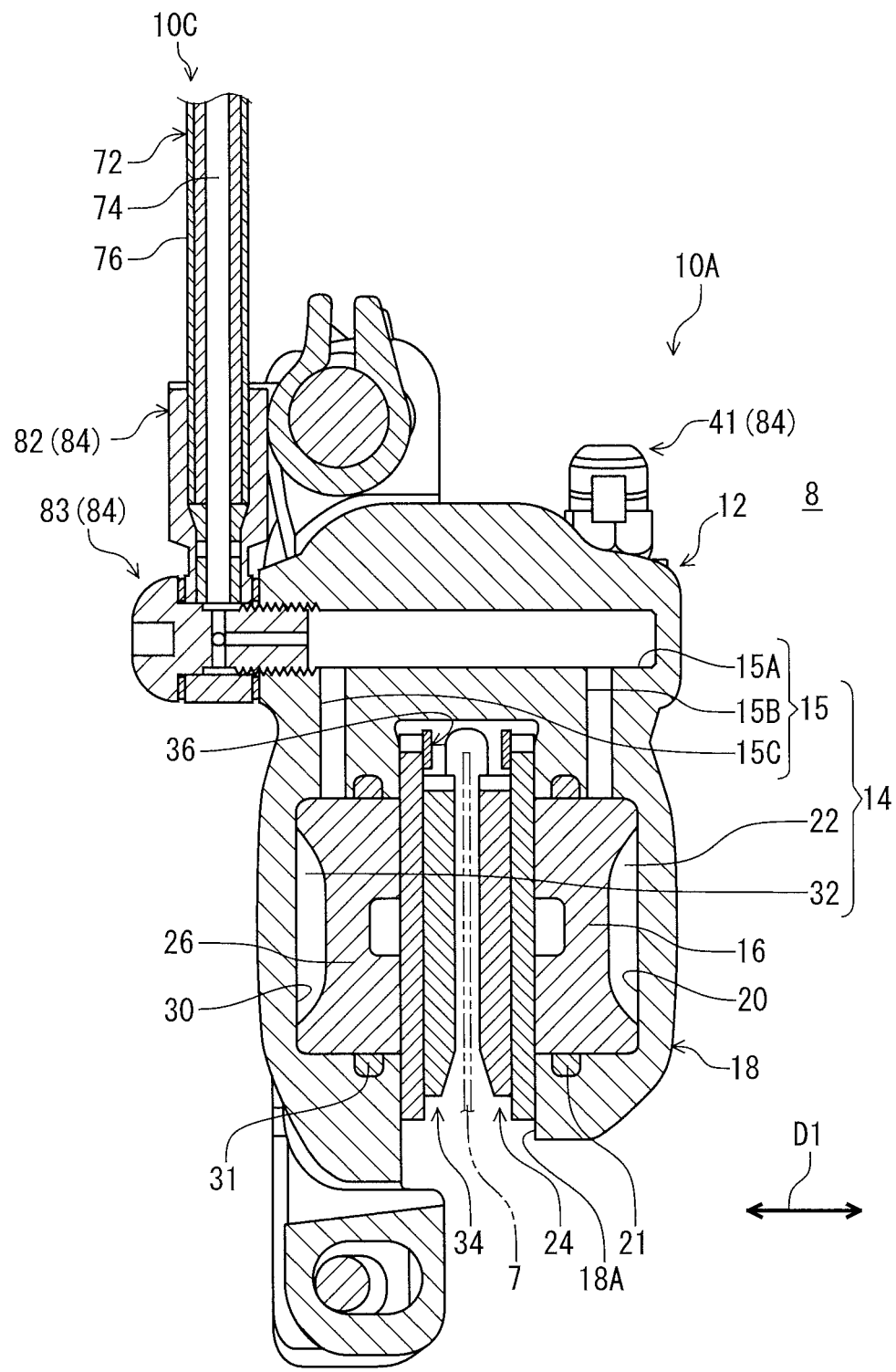
FIG. 18 is a cross-sectional view of a hydraulic device in accordance with another modification.

As seen in FIG. 18, at least one of the hose connector 82, the hose fastener 83, and the bleeding member 41 can include the release member 84. In such modifications, the attachment hole can be omitted from the hydraulic structure.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic device comprising:
   a hydraulic structure including an interior space in which a hydraulic fluid is to be filled; and
   a release member attached to the hydraulic structure so as to be exposed to the interior space and an atmosphere, the release member being configured to release air from the interior space toward the atmosphere in accordance with an internal pressure of the interior space without releasing the hydraulic fluid from the interior space toward the atmosphere,
   wherein the release member is in fluid communication with the interior space that is in fluid communication with a fluid pressure receiving surface of a piston such that, in response to actuation of an operating member, the internal pressure within the interior space that is in fluid communication with the release member increases and a force is applied to the fluid pressure receiving surface of the piston to move the piston.

2. The hydraulic device according to claim 1, wherein the hydraulic structure includes
   the piston, and a base member having a cylinder bore in which the piston is movably arranged.

3. The hydraulic device according to claim 2, wherein the hydraulic structure includes a seal member provided between the piston and the cylinder bore without contacting the release member.

4. A hydraulic device comprising:
a hydraulic structure including an interior space in which a fluid is to be filled; and
a release member attached to the hydraulic structure so as to be exposed to the interior space and an atmosphere, the release member being configured to release air from the interior space toward the atmosphere in accordance with an internal pressure of the interior space, wherein
the hydraulic structure includes
a piston, and
a base member having a cylinder bore in which the piston is movably arranged,
the piston is exposed to the interior space, and
the release member is provided on the piston.

5. The hydraulic device according to claim 2, wherein the hydraulic structure includes a friction member movably provided on the base member in response to a movement of the piston.

6. The hydraulic device according to claim 2, wherein the hydraulic structure includes an additional piston, and the base member has an additional cylinder bore in which the additional piston is movably arranged.

7. The hydraulic device according to claim 6, wherein the hydraulic structure includes an additional seal member provided between the additional piston and the additional cylinder bore without contacting the release member.

8. The hydraulic device according to claim 6, further comprising
an additional release member attached to the hydraulic structure so as to be exposed to the interior space and the atmosphere, the additional release member being configured to release air from the interior space toward the atmosphere in accordance with the internal pressure of the interior space, wherein,
the additional piston is exposed to the interior space, and
the additional release member is provided on the additional piston.

9. The hydraulic device according to claim 6, wherein the hydraulic structure includes an additional friction member movably provided on the base member in response to a movement of the additional piston.

10. The hydraulic device according to claim 2, wherein the operating member is movably provided on the base member so as to operate the piston.

11. The hydraulic device according to claim 10, further comprising
a fluid reservoir configured to be in fluid communication with the interior space via a port, wherein
the piston is configured to open the port in a rest state where the operating member is in a rest position, and
the piston is configured to close the port in an operated state where the operating member is in an operated position.

12. The hydraulic device according to claim 2, wherein the release member is provided on the base member.

13. A hydraulic device comprising:
a hydraulic structure including an interior space in which a fluid is to be filled; and
a release member attached to the hydraulic structure so as to be exposed to the interior space and an atmosphere, the release member being configured to release air from the interior space toward the atmosphere in accordance with an internal pressure of the interior space, wherein
the hydraulic structure includes a flexible hose member defining the interior space, and
the release member is provided within an opening in a wall of the flexible hose member.

14. The hydraulic device according to claim 1, wherein the hydraulic structure has an attachment hole extending from the interior space toward the atmosphere, and
the release member is provided in the attachment hole.

15. The hydraulic device according to claim 14, wherein the attachment hole is provided as a through-hole having a first end opening facing the interior space and a second end opening facing the atmosphere.

16. The hydraulic device according to claim 14, wherein the first end opening has a first diameter, and
the second end opening has a second diameter smaller than the first diameter.

17. The hydraulic device according to claim 1, wherein the release member is configured to release air from the interior space toward the atmosphere in a case where the internal pressure of the interior space is higher than a threshold pressure.

18. The hydraulic device according to claim 1, wherein the release member is replaceably attached to the hydraulic structure.

19. The hydraulic device according to claim 1, wherein the release member is made of a porous material.

20. The hydraulic device according to claim 1, further comprising
an intermediate member provided between the hydraulic structure and the release member.

21. The hydraulic device according to claim 20, wherein the release member is embedded in the intermediate member with insert molding.

22. A vehicle comprising:
the hydraulic device according to claim 1.

23. The hydraulic device according to claim 1, wherein the release member is made of porous ceramics.

24. The hydraulic device according to claim 1, wherein the release member is made of a porous metallic material.

25. The hydraulic device according to claim 1, wherein the release member is made of a porous non-metallic material.

26. The hydraulic device according to claim 25, wherein the porous non-metallic material is a porous resin material.

27. The hydraulic device according to claim 1,
wherein the release member is a gas permeable filter with hydraulic pressure resistance.

* * * * *